United States Patent
Suprasadachandran Pillai et al.

(10) Patent No.: US 10,826,862 B1
(45) Date of Patent: Nov. 3, 2020

(54) GENERATION AND TRANSMISSION OF HIERARCHICAL NOTIFICATIONS TO NETWORKED DEVICES

(71) Applicant: Amazon Technologies, Inc., Seattle, WA (US)

(72) Inventors: Syama Prasad Suprasadachandran Pillai, Bangalore (IN); Jerry Bullard, Kirkland, WA (US); Vivek Narayanan, Bangalore (IN); Vishal Mangesh Shanbhag, Bengaluru (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 137 days.

(21) Appl. No.: 15/907,087

(22) Filed: Feb. 27, 2018

(51) Int. Cl.
| | | |
|---|---|---|
| *H04L 12/58* | (2006.01) | |
| *H04L 12/24* | (2006.01) | |
| *G06F 3/16* | (2006.01) | |
| *G06F 3/0481* | (2013.01) | |
| *G10L 15/22* | (2006.01) | |

(52) U.S. Cl.
CPC ............ *H04L 51/24* (2013.01); *H04L 41/044* (2013.01); *H04L 51/26* (2013.01); *G06F 3/0481* (2013.01); *G06F 3/167* (2013.01); *G10L 15/22* (2013.01); *G10L 2015/228* (2013.01)

(58) Field of Classification Search
CPC ......... H04L 51/24; H04L 51/26; G10L 15/22; G10L 15/265; G10L 2015/221; G10L 2015/223; G10L 2015/228; G06F 3/167; G06F 3/0481
USPC ............... 704/270, 275; 715/204, 789, 811
See application file for complete search history.

(56) References Cited

U.S. PATENT DOCUMENTS

| | | | |
|---|---|---|---|
| 5,933,818 | A | 8/1999 | Kasravi et al. |
| 6,029,195 | A | 2/2000 | Herz |
| 6,041,311 | A | 3/2000 | Chislenko et al. |
| 6,049,777 | A | 4/2000 | Sheena et al. |
| 6,064,980 | A | 5/2000 | Jacobi et al. |
| 6,092,049 | A | 7/2000 | Chislenko et al. |
| 6,356,879 | B2 | 3/2002 | Aggarwal et al. |
| 6,370,513 | B1 | 4/2002 | Kolawa et al. |

(Continued)

FOREIGN PATENT DOCUMENTS

| | | |
|---|---|---|
| WO | WO 2000/04464 A1 | 1/2000 |
| WO | WO 2000/04474 A1 | 1/2000 |
| WO | WO 2000/17792 A1 | 3/2000 |

OTHER PUBLICATIONS

U.S. Appl. No. 11/281,886, filed Nov. 17, 2005 (copies of application text, drawings, and filing receipt provided).

(Continued)

*Primary Examiner* — James S Wozniak
(74) *Attorney, Agent, or Firm* — Knobbe Martens Olson & Bear, LLP

(57) ABSTRACT

A system configured to generate and present hierarchical notifications is provided. The system may generate a notification structure comprising a plurality of notifications associated with a user, and output a top-level composite notification based on the notification structure. The system may receive a user command in response to the composite notification, and further output a lower-level composite notification based on the user-selected portion of the top-level composite notification identified by the user command. Further, the system may modify the notification structure based on the user command.

21 Claims, 13 Drawing Sheets

(56) References Cited

U.S. PATENT DOCUMENTS

| | | |
|---|---|---|
| 6,438,579 B1 | 8/2002 | Hosken |
| 6,493,702 B1 | 12/2002 | Adar et al. |
| 6,611,814 B1 | 8/2003 | Lee et al. |
| 6,742,003 B2 | 5/2004 | Keckerman et al. |
| 6,751,600 B1 | 6/2004 | Wolin |
| 6,801,818 B2 | 10/2004 | Kopcha |
| 6,801,909 B2 | 10/2004 | Delgado et al. |
| 6,912,505 B2 | 6/2005 | Linden et al. |
| 7,051,048 B2 | 5/2006 | Sohma et al. |
| 7,062,487 B1 | 6/2006 | Nagaishi et al. |
| 7,080,059 B1 | 7/2006 | Poston et al. |
| 7,127,450 B1* | 10/2006 | Chang .................. G06F 16/338 |
| 7,533,093 B2 | 5/2009 | Gutta et al. |
| 7,542,951 B1 | 6/2009 | Chakrabarti et al. |
| 7,672,877 B1 | 3/2010 | Acton et al. |
| 7,689,457 B2 | 3/2010 | Chan et al. |
| 7,743,059 B2 | 6/2010 | Chan et al. |
| 7,966,225 B2 | 6/2011 | Chan et al. |
| 8,019,766 B2 | 9/2011 | Chan et al. |
| 8,095,521 B2 | 1/2012 | Chan et al. |
| 8,200,580 B1 | 6/2012 | Grinchenko et al. |
| 8,560,398 B1 | 10/2013 | Gregov et al. |
| 8,707,201 B1* | 4/2014 | Aradhye ............. G06Q 10/107 |
| | | 715/789 |
| 9,336,315 B2 | 5/2016 | Ovsjanikovs |
| 10,317,505 B1* | 6/2019 | Sipko .................... G06F 9/542 |
| 2002/0174119 A1 | 11/2002 | Kummamuru et al. |
| 2002/0184139 A1 | 12/2002 | Chickering et al. |
| 2003/0097196 A1 | 5/2003 | Gutta et al. |
| 2003/0105682 A1 | 6/2003 | Dicker et al. |
| 2003/0110181 A1 | 6/2003 | Schuetze et al. |
| 2003/0158793 A1 | 8/2003 | Takakura et al. |
| 2003/0172357 A1 | 9/2003 | Kao et al. |
| 2003/0179236 A1 | 9/2003 | Good et al. |
| 2003/0208399 A1 | 11/2003 | Basak et al. |
| 2004/0015415 A1 | 1/2004 | Cofino et al. |
| 2004/0093321 A1 | 5/2004 | Roustant et al. |
| 2004/0117831 A1 | 6/2004 | Ellis et al. |
| 2004/0181554 A1 | 9/2004 | Heckerman et al. |
| 2005/0027712 A1 | 2/2005 | Gargi et al. |
| 2005/0060353 A1 | 3/2005 | Tan et al. |
| 2005/0102202 A1 | 5/2005 | Linden et al. |
| 2005/0256866 A1 | 11/2005 | Lu et al. |
| 2005/0256867 A1 | 11/2005 | Walther et al. |
| 2006/0004799 A1 | 1/2006 | Wailender |
| 2006/0020614 A1 | 1/2006 | Kotawa et al. |
| 2006/0041548 A1 | 2/2006 | Parsons et al. |
| 2006/0161535 A1 | 7/2006 | Holbrook |
| 2006/0212878 A1* | 9/2006 | Park ........................ H04L 67/16 |
| | | 719/319 |
| 2006/0259344 A1 | 11/2006 | Patel |
| 2007/0016575 A1 | 1/2007 | Hurst-Hiller et al. |
| 2007/0032244 A1 | 2/2007 | Counts et al. |
| 2007/0043688 A1 | 2/2007 | Koontz et al. |
| 2007/0078832 A1 | 4/2007 | Ott, IV et al. |
| 2007/0185901 A1 | 8/2007 | Gates et al. |
| 2007/0192308 A1 | 8/2007 | Wei et al. |
| 2008/0005064 A1 | 1/2008 | Sarukkai |
| 2008/0046343 A1 | 2/2008 | Maguire et al. |
| 2008/0092044 A1 | 4/2008 | Lewis et al. |
| 2008/0104111 A1 | 5/2008 | Slaney et al. |
| 2008/0114644 A1 | 5/2008 | Frank et al. |
| 2008/0189733 A1 | 8/2008 | Apostolopoulos |
| 2008/0243817 A1 | 10/2008 | Chan et al. |
| 2011/0161085 A1* | 6/2011 | Boda ..................... G06Q 30/02 |
| | | 704/260 |
| 2012/0089621 A1 | 4/2012 | Liu |
| 2012/0246246 A1* | 9/2012 | Moore ............... H04N 21/4333 |
| | | 709/206 |
| 2013/0111356 A1* | 5/2013 | Vasudevan .......... G06F 3/04817 |
| | | 715/753 |
| 2013/0316744 A1* | 11/2013 | Newham ............... H04M 19/04 |
| | | 455/458 |
| 2014/0101189 A1* | 4/2014 | Schenkel ................ G06F 16/24 |
| | | 707/758 |
| 2014/0122456 A1 | 5/2014 | Dies |
| 2014/0280657 A1* | 9/2014 | Miller ..................... H04L 51/26 |
| | | 709/207 |
| 2014/0282003 A1* | 9/2014 | Gruber ..................... G06F 3/165 |
| | | 715/727 |
| 2014/0324215 A1* | 10/2014 | Leblang ................. G06Q 10/08 |
| | | 700/216 |
| 2014/0351744 A1* | 11/2014 | Jeon ...................... G06F 3/0482 |
| | | 715/781 |
| 2015/0018991 A1* | 1/2015 | Arnold ............... G01G 23/3728 |
| | | 700/91 |
| 2016/0119474 A1* | 4/2016 | Malik ................... H04M 3/493 |
| | | 379/88.22 |
| 2016/0260296 A1* | 9/2016 | Shirriff .................... G08B 5/22 |
| 2017/0185650 A1* | 6/2017 | Vainas ............. G06F 16/24575 |
| 2017/0193982 A1* | 7/2017 | Agrawal ............ G06K 9/00335 |
| 2017/0346872 A1* | 11/2017 | Naik ..................... H04L 65/604 |
| 2018/0041623 A1* | 2/2018 | Song ................... G06F 3/04817 |
| 2018/0046929 A1* | 2/2018 | Xuan ..................... G06Q 10/00 |
| 2018/0063062 A1* | 3/2018 | Burdakov ............... H04L 51/26 |
| 2018/0063063 A1* | 3/2018 | Yan ........................ G06F 17/271 |
| 2018/0081618 A1* | 3/2018 | McLean .................. G06F 3/165 |
| 2018/0101297 A1* | 4/2018 | Yang ................. H04M 1/72522 |
| 2019/0103111 A1* | 4/2019 | Tiwari .................... G10L 15/22 |
| 2019/0158447 A1* | 5/2019 | Aggarwal ............... H04L 51/24 |

OTHER PUBLICATIONS

International Search Report and Written Opinion in International Appl. PCT/US2008/058745, published as WO2008/121872.

International Search Report and Written Opinion in International Appl. PCT/US2008/058762, published as WO2008/121884.

Nairn, et al., Something approaching science? Cluster analysis procedures in a CRM era, Jun. 2003, International Journal of Market Research, 45, 2, 241 (23).

Notification of concurrently-filed applications in one page.

Schafer et al., "E-Commerce Recommendation Applications," Data Mining and Knowledge Discovery, vol. 5, Nos. 1-2, Jan. 2001, pp. 115-153.

Shopzilla Showcases Technological Innovations with Establishment of zLabs; Shopzilla Invests in R&D to Advance Comparison Shopping Search Technology. Business Wire, p. NA, Jun. 22, 2005.

* cited by examiner

400

"AUDIO ASSISTANT, SHOW ME MY NOTIFICATIONS"

"YOU HAVE 3 EMAILS, 10 DEALS, AND 5 BOOK RECOMMENDATIONS"

"SHOW ME DEALS"

"$20 DEAL ON TITLEIST PRO V1 GOLF BALLS, 3 DEALS ON HEADPHONES, 5 DEALS ON SHOES"

"SHOW ME SHOES"

"$30 DEAL ON NIKE RUNNING SHOES, $50 DEAL ON NORTH FACE HIKING BOOTS, AND 3 OTHER DEALS ON DRESS SHOES"

"ORDER THE NIKE RUNNING SHOES FOR ME"

"PURCHASE COMPLETE"

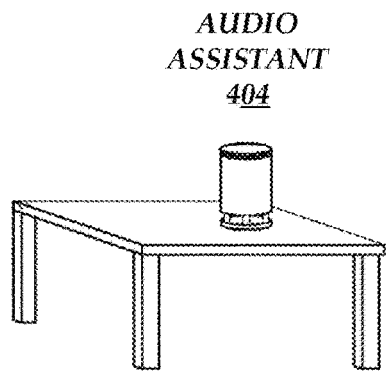

AUDIO ASSISTANT 404

USER 402

*FIG. 4*

GENERATION AND TRANSMISSION OF HIERARCHICAL NOTIFICATIONS TO NETWORKED DEVICES

BACKGROUND

In today's world, electronic devices are often connected to one or more networks and provide useful information to their users via such networks. For example, a user's smartphone may display text message notifications that correspond to the text messages sent to the user's smartphone. In another example, the user's laptop computer may display email notifications that correspond to the emails sent to the user's email account. The user may browse these notifications and choose which text message or email to open.

SUMMARY

Various techniques for generating and transmitting hierarchical notifications to networked devices are described herein. Although many of the examples are described in the context of an electronic marketplace system, the techniques described herein can be applied to any network environment such as an email system, a social networking system, or any other system that can provide notifications. The hierarchical notifications may be generated and transmitted based on the networked device from which presentation of such notifications is requested. For example, the hierarchical notifications generated and transmitted in response to a request from an audio assistant may differ from the hierarchical notifications generated and transmitted in response to a request from a display device. The hierarchical notifications may be further tailored or optimized for presentation on the specific networked device in view of the output type (e.g., audio, image, video, etc.) and the output specifications (e.g., length of audible notifications, display screen size, etc.). Further, the structure of the hierarchical notifications may be modified based on user interactions with the hierarchical notifications presented on the user's networked device. For example, based on the specific graphical user interface (GUI) element or audio user interface (AUI) element selected by the user on the networked device, subsequent presentations of the hierarchical notifications presented on the networked device may be altered. These and other techniques are described in greater detail below with reference to FIGS. 1-12.

BRIEF DESCRIPTION OF THE DRAWINGS

The embodiments described herein are illustrated by way of example, and not by way of limitation, in the figures of the accompanying drawings in which like references indicate similar elements.

FIG. 4 illustrates an example of interactions between a user and an audio assistant in accordance with aspects of this disclosure.

DETAILED DESCRIPTION

Introduction

Figure 1:
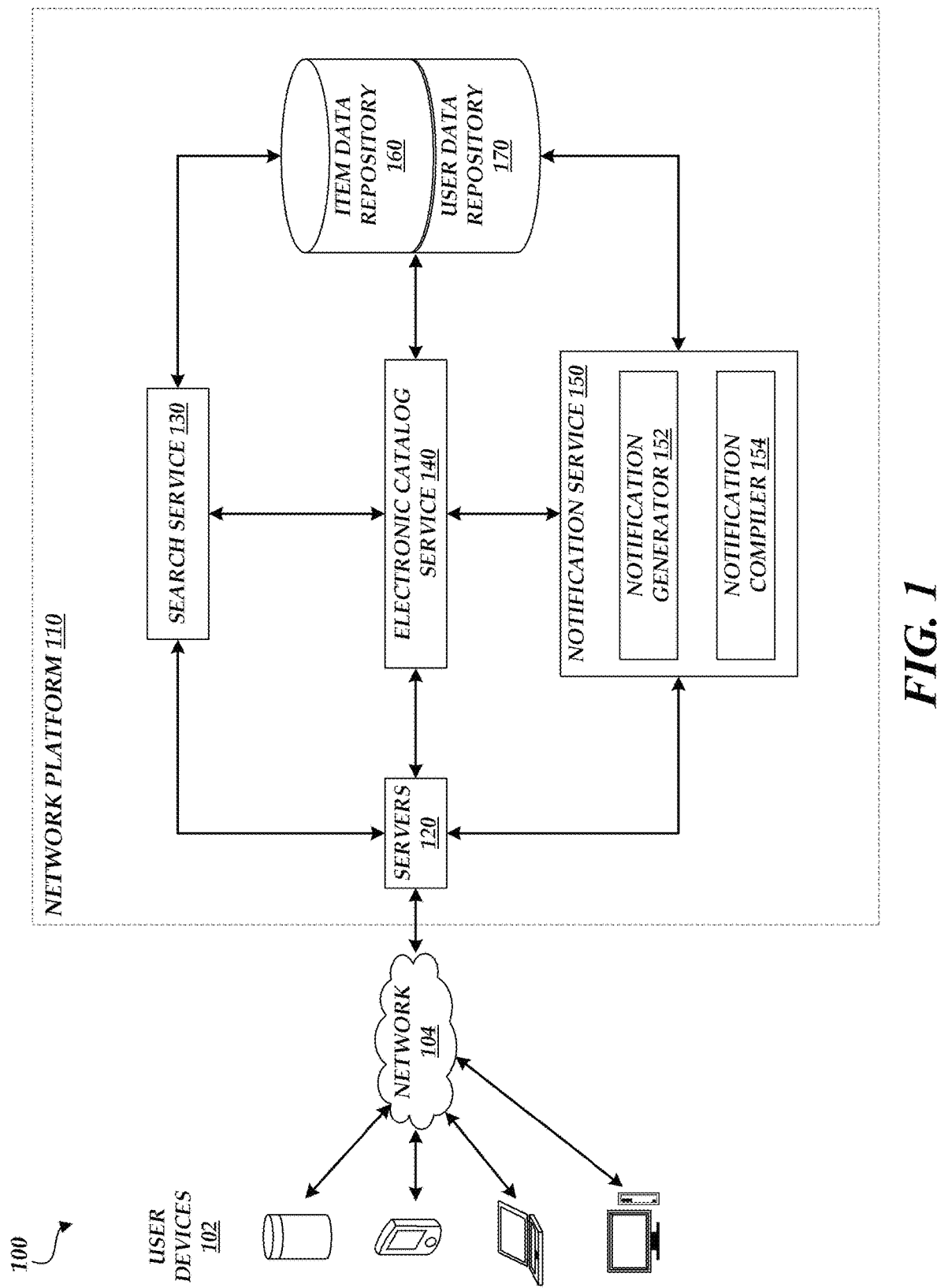
FIG. 1 is a schematic diagram of an example network environment in accordance with aspects of this disclosure.

In today's world, people rely heavily on networked devices to obtain information and communicate with others, and a typical individual uses multiple types of such networked devices (e.g., a smartphone, tablet, a desktop computer, electronic book reader, audio assistant, etc.). Such networked devices may provide the user with notifications to alert the user about events that the user may find interesting. For example, the user may want to be notified about an email that she received from her friend, a news report on a fire that broke out near her home, or a new novel by her favorite author. If many notifications are available to be presented to the user, simply outputting all such notifications (e.g., via a display or an audio interface) may overwhelm the user. However, if the networked device outputted a portion of the notifications instead, there is a risk of omitting a notification that may be important to the user (e.g., an urgent email from her boss or a notice regarding a security update). Further, given the difference in the specifications of the various networked devices (e.g., type of user interface, screen size, etc.), how notifications should be presented on one networked device (e.g., a desktop computer with a large monitor) may differ from how they should be presented on another networked device (e.g., an audio device without a display). For example, displaying a list of 15 email notifications on a computer monitor may be acceptable, whereas audibly outputting 15 email notifications with an audio assistant may not, due to the time and patience it would take for a user to listen to them. Thus, an improved method of generating and presenting notifications on a networked device in a way that does not overload its user and/or reflects the specifications of the networked device is desired.

Certain embodiments herein describe a hierarchy of notifications (also referred to herein as a notification structure) that may be generated. In some embodiments, notifications may be presented to a user based on the hierarchy of notifications. The hierarchy of notifications can be modified based at least in part on how the user interacts with the notifications presented on the user's networked device (e.g., a device having a display and/or or an audio interface such as a loudspeaker or headphone output). For example, a more frequently activated notification may be moved up in the hierarchy such that the notification becomes more easily accessible by the user, thereby reducing a delay associated with reaching the desired notification. Further, the hierarchy of notifications may be generated based on the type of networked device from which presentation of such notifications is requested. For example, the hierarchy of notifications generated and transmitted in response to a request from a networked device that can provide audible notifications (e.g., based on the networked device not having a display or based on the user's preference to use the audio output of the networked device) may differ from the hierarchy of notifications generated and transmitted in response to a request from a networked device that can provide visual notifications (e.g., based on the networked device not having an audio output or based on the user's preference to use the display of the networked device). For example, the user may prefer to be presented notifications relating to photo uploads from friends on his smartphone but not on his audio assistant. By generating and maintaining device-specific or output-type-specific hierarchies of notifications, the user's device-specific preferences may be reflected in the notifications presented to the user.

Overview of Example Network Environment

FIG. 1 illustrates an example network environment 100 in which notifications may be generated and provided to users according to the various techniques described herein. The illustrative environment shown in FIG. 1 includes a network platform 110 that generates and provides notifications to user devices 102 via a network 104.

By way of illustration, various example user devices 102 are shown in communication with the network platform 110, including an audio assistant (represented as a canister, although other shapes may be used), a smartphone, a laptop computer, and a desktop computer. In general, the user devices 102 can be any networked device such as a desktop computer, a laptop computer, a tablet computer, a smartphone or mobile phone, a personal digital assistant, a voice-controlled intelligent personal assistant device, a display device, an audio device, a kiosk, a gaming console or controller, a television, a wristwatch (including a smartwatch), an electronic book reader, a wireless device, a set-top box or other television box, a media player, a processor device, integrated circuit components for inclusion in computing devices or appliances, or electronic devices for inclusion in vehicles, appliances, or machinery, and the like. The user devices 102 may each include an output device (e.g., a display and/or a speaker). In some embodiments, an audio assistant described herein includes an audio output device but does not include a display output device. In other embodiments, such an audio assistant includes both an audio output device and a display output device.

The user devices 102 may access the network platform 110 over the network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. Any suitable protocol and component for communicating via the Internet or any of the other aforementioned types of communication networks may be used.

In the depicted embodiment, the network platform 110 includes servers 120, which can communicate with the user devices 102 over the network 104 and provide access to various services of the network platform 110. In the illustrated embodiment, the services provided by the network platform 110 include a search service 130, an electronic catalog service 140, and a notification service 150. In some embodiments, these services can be implemented as software components executing on physical computer hardware of the servers 120 or in separate computing devices. More or fewer services may be provided in other embodiments.

The search service 130 and the electronic catalog service 140 can provide users with access to an electronic catalog stored in an item data repository 160. The electronic catalog may include information regarding items that may be purchased, rented, or otherwise accessed by the users of the user devices 102. The information in the electronic catalog can be hierarchically organized according to categories, subcategories, and the like. The electronic catalog information contained in the item data repository 160 can include items other than products or services, such as blogs, periodicals, social networking profiles, or the like. In some embodiments, the item data repository 160 may store digital content items (e.g., audiobooks, electronic books, music, movies, multimedia works, or the like). The search service 130 and the electronic catalog service 140 may provide users with access to the items in the electronic catalog by way of a network site, which may be a network resource such as a web site or a mobile application. For example, the electronic catalog service 140 can generate network pages that include detailed information regarding particular items. This specification sometimes refers to a network page that includes detailed information regarding a particular item as an item detail page.

The notification service 150 of the network platform 110 may implement one or more composite notification generation and modification techniques described herein. For example, the notification service 150 may facilitate generation and transmission of hierarchical notifications to the user devices 102. The phrase "hierarchical notifications" or a "hierarchy" of notifications as used herein, in addition to having its ordinary meaning, can refer to a set of multiple notifications organized in a hierarchical fashion. Such hierarchical notifications may be arranged in a specific order and in multiple groups or levels. For example, a hierarchy of 20 notifications may be arranged in 3 groups at the top (or most generic) level (e.g., 10 email notifications, 5 deal notifications, and 5 book recommendations), and in additional groups at the subsequent, increasingly more specific level(s) (e.g., 10 email notifications may be divided into an email from a friend, two emails from a colleague, and 7 other emails, where the 7 other emails may further be divided into multiple more specific groups).

In the depicted embodiment, the notification service 150 includes a notification generator 152 and a notification compiler 154. The notification generator 152 can generate notifications that may be transmitted to the user devices 102. Such notifications may include indications of incoming messages or other actions detected by the network platform 110 (e.g., email/text/audio/video messages sent to the user, "likes" on the user's post, etc.), notifications that recommend items based on the user's prior actions (e.g., purchases, downloads, registrations, or other suggested actions based on the user's search history, browse history, purchase history, or other transaction history), or any other notifications triggered based on the user's preferences and settings (e.g., a newsfeed update, a news alert, a stock price alert, a software update, etc.). The notification compiler 154 can compile the generated notifications into a hierarchy based at least in part on the specifications of the user device 102 on which the notifications are to be presented and/or the probabilities associated with the individual notifications. The probabilities can refer to, for example, predicted likelihood of the user activating or interacting with a given notification.

The notification service 150 may communicate with a user data repository 170 that stores data related to users of the network platform 110. For example, user data stored in the user data repository 170 may include, but is not limited to, user ID, login credentials, user account type, purchase history, browse history, search history, settings/preferences, and/or other information. Further, the notifications and hierarchies of notifications generated for a given user according to the techniques described herein may be stored in the user data repository 170.

In some embodiments, the network platform 110 may include other components not illustrated in FIG. 1. For example, the network platform 110 may include an email or other messaging service that can allow the user devices 102 to receive and send messages. In another example, the network platform 110 may include a social networking service that can allow the users to communicate with other users of the network platform 110.

In FIG. 1, the network platform 110 is depicted as operating in a distributed computing environment including several computer systems that are interconnected using one or more computer networks. The network platform 110 could also operate within a computing environment having a fewer or greater number of devices than are illustrated in FIG. 1. Thus, the depiction of the network platform 110 in FIG. 1 should be taken as illustrative and not limiting to the present disclosure. For example, the network platform 110 or various constituents thereof could implement various Web services components, hosted or "cloud" computing environments, and/or peer-to-peer network configurations to implement at least a portion of the processes described herein. Further, the network platform 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

Moreover, the processing of the various components or services of the network platform 110 can be distributed across multiple machines, networks, or other computing resources. The various components or services of the network platform 110 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the network platform 110 can be stored in the memories of the servers 120 and/or on other types of non-transitory computer-readable storage media. While some examples of possible connections are shown, any subset of the components shown can communicate with any other subset of components in various implementations.

Architecture of Example Notification Service

Figure 2:
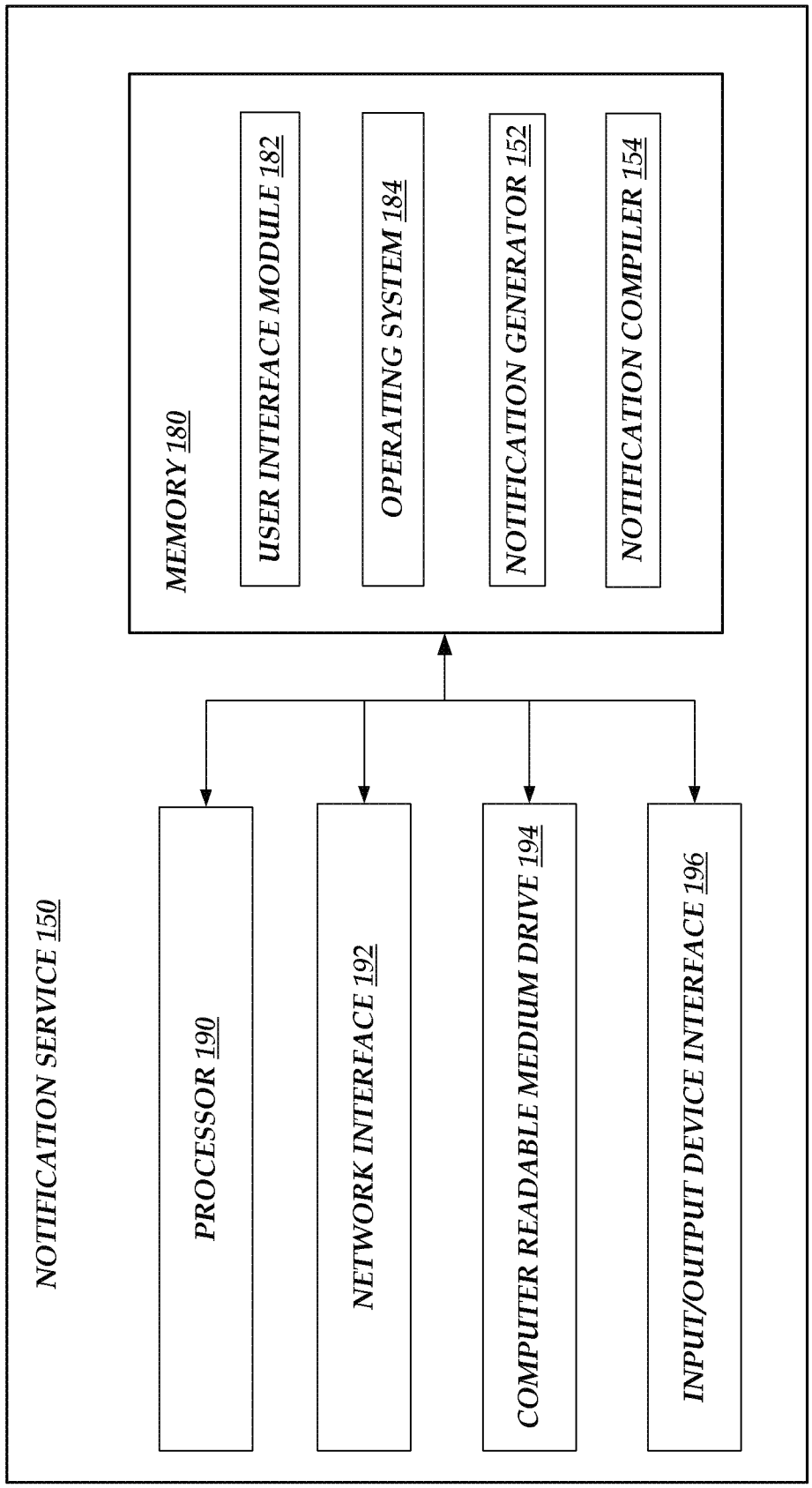
FIG. 2 illustrates a general architecture of an example notification service in accordance with aspects of this disclosure.

FIG. 2 depicts an example architecture of a computing system (referenced as a notification service 150) that generates and provides notifications according to one or more techniques described herein. The general architecture of the notification service 150 depicted in FIG. 2 includes an arrangement of computer hardware and software modules that may be used to implement aspects of the present disclosure. The notification service 150 may include many more (or fewer) elements than those shown in FIG. 2.

As illustrated in FIG. 2, the notification service 150 includes a memory 180, a processor 190, a network interface 192, a computer readable medium drive 194, and an input/output device interface 196, all of which may communicate with one another by way of a communication bus. The network interface 192 may provide connectivity to one or more networks or computing systems. The processor 190 may receive information and instructions from other computing systems or services via the network 104. The processor 190 may also communicate with the memory 180 to execute one or more instructions stored thereon.

The memory 180 may contain computer program instructions (grouped as modules in some embodiments) that the processor 190 executes in order to implement one or more aspects of the present disclosure. The memory 180 generally includes RAM, ROM, and/or other persistent, auxiliary, or non-transitory computer readable media. The memory 180 may store an operating system 184 that provides computer program instructions for use by the processor 190 in the general administration and operation of the notification service 150. The memory 180 may further include computer program instructions and other information for implementing aspects of the present disclosure. For example, in one embodiment, the memory 180 includes a user interface module 182 that generates user interfaces (and/or instructions therefor) for display upon a computing device, e.g., via a navigation and/or browsing interface such as a browser or application installed on the computing device. In addition, the memory 180 may include or communicate with a user data repository 170 and/or one or more other data stores, as discussed above with reference to FIG. 1.

In addition to and/or in combination with the user interface module 182, the memory 180 may include a notification generator 152 and a notification compiler 154 that may be executed by the processor 190. In one embodiment, the user interface module 182, notification generator 152, and notification compiler 154 individually or collectively implement various aspects of the present disclosure, e.g., generating notifications, compiling the notifications into a hierarchy of notifications, transmitting the hierarchy of notifications to the user devices 102 for presentation to a user, and modifying the hierarchy in response to one or more user actions, as described further below.

While the notification generator 152 and the notification compiler 154 are shown in the example of FIG. 2 as part of the notification service 150, in other embodiments, all or a portion of a notification generator 152 and/or a notification compiler 154 may be implemented by other components of the network platform 110 and/or another computing device. For example, in certain embodiments of the present disclosure, another computing device in communication with the network platform 110 may include several modules or components that operate similarly to the modules and components illustrated as part of the notification service 150. It will also be appreciated that, in some embodiments, a user device may implement functionality that is otherwise described herein as being implemented by the elements and/or modules of the notification service 150. For example, the user device 102 may receive code modules or other instructions from the notification service 150 and/or other components of the network platform 110 via the network 104 that are executed by the user device 102 to implement various aspects of the present disclosure.

Example Hierarchical Structure of Notifications

Figure 3:
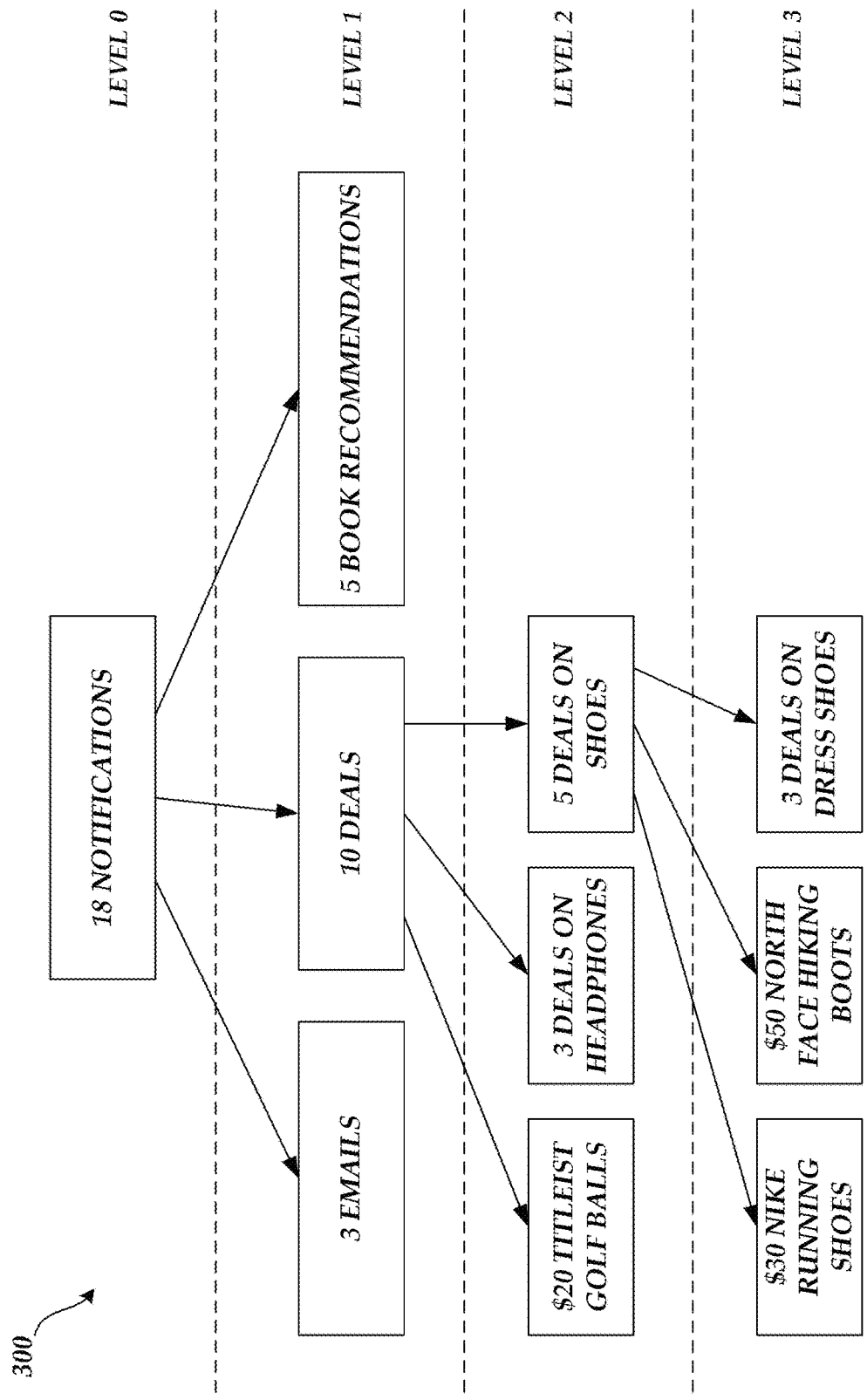
FIG. 3 is a block diagram illustrating an example notification structure in accordance with aspects of the present disclosure.

With reference now to FIG. 3, an example notification structure 300 will be described. The notification structure 300 includes multiple levels of notifications organized in a hierarchical fashion. For example, the notification structure 300 includes 18 notifications total (level 0). The 18 notifications in this example are divided into three groups of notifications at level 1 (e.g., 3 email notifications, 10 deal notifications, and 5 book recommendations). The 10 deals may further be divided into three groups of notifications at level 2 (e.g., $20 Titleist golf balls, 3 deals on headphones, and 5 deals on shoes). The 5 deals on shoes are further be divided into three groups of notifications at level 3 ($30 Nike running shoes, $50 North Face hiking boots, and 3 deals on dress shoes). Although the notification structure 300 of FIG. 3 utilizes a tree structure, the embodiments described herein are not limited as such and may utilize other forms of structure for storing nested content.

As discussed above, the notifications in the notification structure 300 may be generated based on the indications of incoming messages or other actions detected by the network platform 110 (e.g., email/text/audio/video messages sent to the user, "likes" on the user's post, etc.), recommendations generated based on the user's prior actions (e.g., purchases, downloads, registrations, or other suggested actions based on the user's search history, browse history, purchase history, or other transaction history), or any other notifications triggered based on the user's preferences and settings (e.g., a newsfeed update, a news alert, a stock price alert, a software update, etc.). The generated notifications can be compiled into the notification structure by the notification service 150 based on the specifications of the user device 102 on which the notifications are to be presented and/or the probabilities (e.g., predicted likelihood of the user activating a given notification) associated with the individual notifications. For example, the notification service 150 may assign the 3 email notifications, 10 deal notifications, and 5 books recommendations to level 1 based on a determination that these notifications collectively cover a threshold percentage of actions that the user is expected to take. For example, the notification service 150 may determine that there is a 50% chance that the user will check the 3 email notifications, 20% chance that the user will check the 10 deal notifications, 10% chance that the user will check the 5 book recommendations, and 7%, 6%, 5%, and 2% chance that the user will check various other notifications. Based on this determination, the notification service 150 may select the top 3 notifications or notification categories (or another threshold number of notifications or notification categories) and assign them to the top level (e.g., level 1). The notification service 150 may arrange the three categories of notifications based on their respective probabilities. For example, based on a determination that the probability associated with the 3 email notifications is the highest among the notification categories assigned to the top level, the notification service 150 may include the 3 email notifications as the first notification at the top level. Further, based on a determination that the probability associated with the 10 deal notifications is the highest in the remaining notification categories assigned to the top level, the notification service 150 may include the 10 deal notifications as the next notification (after the 3 email notifications) in at the top level. Further, based on a determination that the probability associated with the 5 book recommendations is the highest in the remaining notification categories assigned to the top level, the notification service 150 may include the 5 book recommendations as the next notification (after the 10 deal notifications) in at the top level. Options for how the notifications in the notification structure 300 may be presented to the user are described in greater detail below with reference to FIG. 4.

In some cases, the notification structure may be user-device-specific and/or output-type-specific. For example, a notification likely to be accessed by the user via a GUI (e.g., a photo update from a friend) may not be likely to be accessed by the user via an AUI, and vice versa. Thus, the notification service 150 may determine the notification structure to be more suitable for a device with a screen or more suitable for a device with audio output. Sometimes, the notification structure may be the same for different device types, but more often, the notification service 150 will purposefully generate different notification structures for different device types to improve the user's experience with those notifications on different devices. Yet even among devices of a similar type (e.g., screen vs. audio), the notification service 150 may determine different notification structures. For example, the notification service 150 can generate a more complex notification structure with more levels or more items for a larger screen. The notification service 150 may also determine different notification structures are applicable at different times or situations. For instance, the notification service 150 may determine that the user explores a fewer number of notifications or levels in the morning than at night (or a fewer number of notifications or levels on weekdays than on weekends). Based on such a determination, the notification service 150 may present notifications based on a notification structure having a fewer number of notifications or levels in the morning (or on weekdays), and present notifications based on a notification structure having a greater number of notifications or levels at night (or on weekends). In some cases, the notification service 150 may include a fewer number of notifications on a given level based on such determinations.

In some embodiments, the notification structure 300 may include additional notifications not shown in the example of FIG. 3. For example, level 2 of the notification structure 300 may include additional notifications that correspond to the groups in level 1 (e.g., 3 emails and/or 5 book recommendations), and level 3 of the notification structure 300 may include additional notifications that correspond to the groups in level 2 (e.g., 3 deals on headphones, or other level-2 groups corresponding to 3 emails and/or 5 books recommendations of level 1). Further, although the notifications are divided into three groups at each level in the example of FIG. 3, the notifications may be divided into any number groups (e.g., 2, 3, 4 or 5+).

Example Interaction Between User and Networked Device

With reference now to FIG. 4, an example interaction 400 between a user 402 and an audio assistant 404 will be described. The interaction 400 illustrates how the notifications compiled in the notification structure 300 shown in the example of FIG. 3 may be presented to the user via an audio device. As explained below with reference to FIG. 5, the notification structure 300 illustrated in FIG. 3 may be modified based on the interaction 400.

The audio assistant 404 may include a microphone for receiving audible commands of the user, a loudspeaker for outputting audible notifications to the user, a hardware processor executing instructions stored in a memory to perform the notification presentation techniques described herein. Some embodiments of the audio assistant 404 may also have a screen, but some embodiments do not. One characteristic of some embodiments of the audio assistant 404 that can contrast with other devices (such as smartphones) is that the audio assistant 404 may be used typically in a single location. For instance, a user may place the audio assistant 404 in a room and leave it there, interacting with the audio assistant 404 whenever the user enters the room. The audio assistant 404 may even be embedded in a location, such as a wall or ceiling, as a fixture, although it is shown in the depicted embodiment as a somewhat portable device. The audio assistant 404 may communicate with a notification server (e.g., network platform 110 of FIG. 2) to receive notification data associated with the user and to provide data relating to the voice commands of the user.

As illustrated in FIG. 4, the following example exchange occurs. The user 402 provides a voice command that says, "Audio Assistant, show me my notifications." In response, the audio assistant 404 provides an audible composite notification that says, "You have 3 emails, 10 deals, and 5 book recommendations." Although "Audio Assistant" is used as an example trigger word, other words or phrases can be used to signal to the audio assistant 404 that a voice command may follow. For example, upon receiving the trigger word, the audio assistant 404 may listen for a voice command for a predefined amount of time (e.g., 3 second, 5 seconds, 1 minute, etc.). After the predefined amount of time, the audio assistant 404 may stop listening for a voice command and not act on voice input other than the trigger word. In some embodiments, upon receiving a voice command following the trigger word, the audio assistant 404 may continue to listen for additional voice commands for a predefined amount of time (e.g., 5 seconds, 30 seconds, 2 minutes, etc.). The predefined amount of time for which the audio assistant 404 listens for additional voice commands after the initial voice command may be less than or greater than the predefined amount of time for which the audio assistant 404 listens for the initial voice command following the trigger word. In other cases, the predefined amount of time may be the same (or substantially the same). As used herein, the phrase "composite notification," in addition to having its ordinary meaning, can refer to a notification made up of multiple notifications. In response to the audible composite notification, the user 402 provides a voice command that says, "Show me deals." In response, the audio assistant 404 provides an audible composite notification that says, "$20 deal on Titleist Pro V1 golf balls, 3 deals on headphones, and 5 deals on shoes." In response, the user 402 provides a voice command that says, "Show me shoes." In response, the audio assistant 404 provides an audible composite notification that says, "$30 deal on Nike running shoes, $50 deal on North Face hiking boots, and 3 other deals on dress shoes." In response, the user 402 provides a voice command that says, "Order the Nike running shoes for me." In response, the audio assistant 404 causes the Nike running shoes to be purchased on behalf of the user and provides an audible notification that says, "Purchase complete."

Although the notifications at level 1 are initially presented to the user upon detecting a request for notifications (e.g., "show me my notifications") in the example of FIG. 4, in some embodiments, the notifications at level 0 may be initially presented to the user upon detecting such a request or determining that notifications should be provided to the user. For example, the audio assistant 404 may provide "You have 18 notifications," and move onto "You have 3 emails, 10 deals, and 5 book recommendations" in response to a voice command indicating that the user wishes to explore the 18 notifications.

Further, although the notifications are presented to the user in response to a user request for notifications in the example of FIG. 4, in some embodiments, the audio assistant 404 may present notifications to the user spontaneously and without detecting a request for notifications (e.g., periodically, upon detecting a voice interaction or a threshold level of sound, upon detecting the user's presence in the vicinity of the audio assistant 404, and the like).

Composite Notification Output Routine

Figure 5:
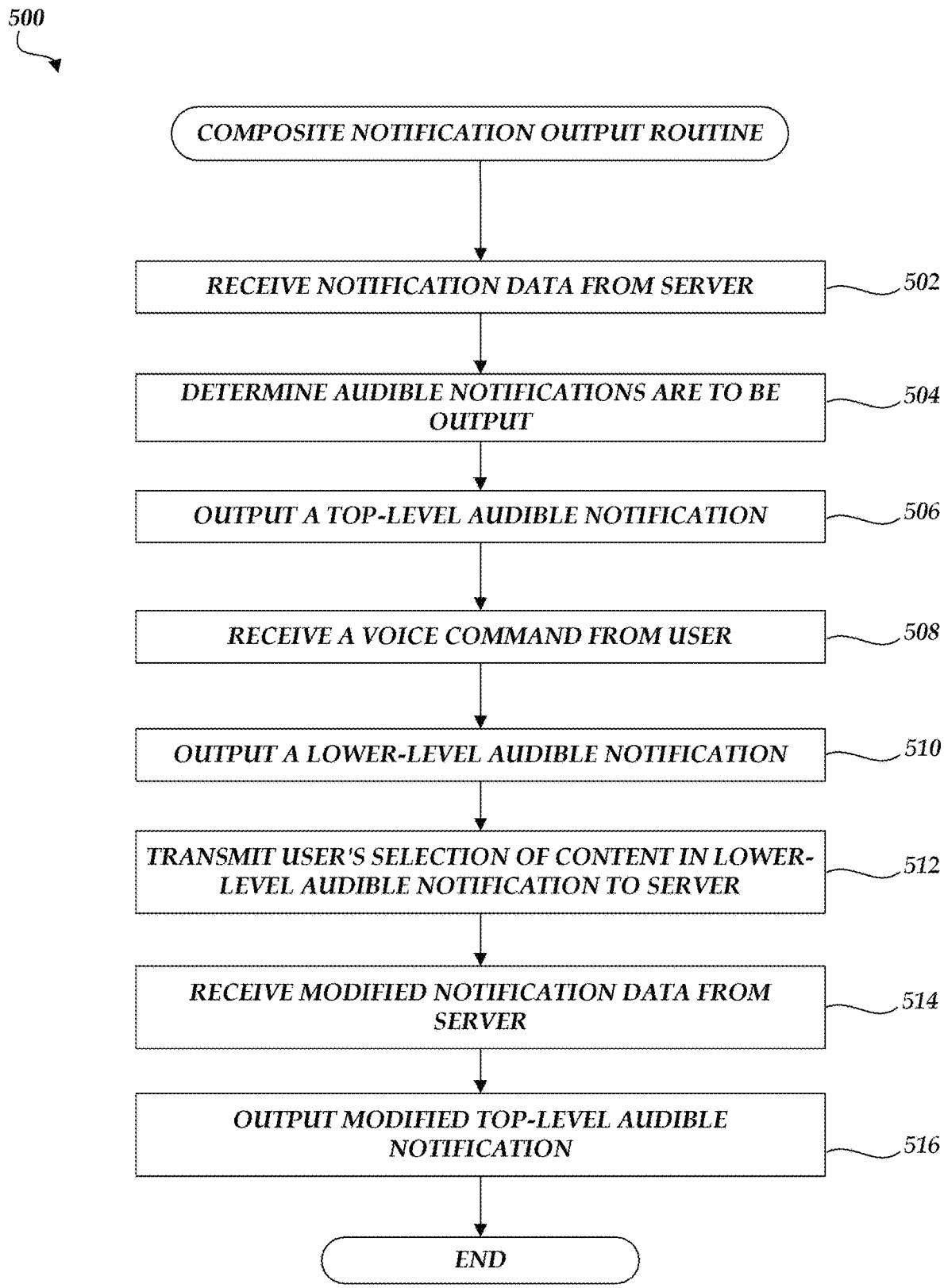
FIG. 5 illustrates an example composite notification output routine in accordance with aspects of this disclosure.

With reference now to FIG. 5, an example composite notification output routine 500 will be described. The example routine 500 may be carried out, for example, by one of the user devices 102 of FIG. 2 (e.g., an audio device or a display device) or the audio assistant 404 described with reference to FIG. 4. The routine 500 illustrates an example algorithm that may be programmed, using any suitable programming environment or language, to create machine code capable of execution by a CPU or microcontroller of the user device 102. For convenience, the steps of the example routine 500 are described as being performed by the audio assistant 404.

At block 502, the audio assistant 404 receives notification data associated with the user from a notification server (e.g., the network platform 110). As described above, the audio assistant 404 may include a microphone for receiving audible commands of the user, a loudspeaker for outputting audible notifications to the user, a hardware processor executing instructions stored in a memory to perform the notification presentation techniques described herein. In some embodiments, the audio assistant 404 includes a display screen. In other embodiments, the audio assistant 404 does not include a display screen.

At block 504, the audio assistant 404 determines an indication to output audible notifications associated with the user. For example, the indication may be determined upon detecting a voice command associated with presentation of notifications (e.g., "show me my notifications"). Alternatively, the indication may be determined spontaneously and without detecting a specific voice command corresponding to presentation of notifications or a request for notifications. For example, the indication may be determined periodically, upon detecting a voice interaction or a threshold level of sound, upon detecting the user's presence in the vicinity of the audio assistant 404 (e.g., within wireless (such as Bluetooth™) transmitter range), and the like.

At block 506, the audio assistant 404 outputs a top-level audible notification via the loudspeaker based on the notification data associated with the user. As described herein, multiple notifications (e.g., audible or visual) may be arranged in a hierarchical fashion, for example, in a specific order and in multiple groups or levels. For example, as shown in the example of FIG. 3, a hierarchy of 18 notifications may be arranged in 3 groups at the top (or most generic) level (e.g., 3 email notifications, 10 deal notifications, and 5 book recommendations), and in additional groups at the subsequent lower (or increasingly more specific) level(s) (e.g., the 10 deal notifications may comprise a deal on golf balls, 3 deals on headphones, and 5 deals on shoes, where the 5 deals on shoes may further be divided into multiple more specific groups, such as a deal on sandals, a deal on dress shoes, and 3 deals on running shoes). For example, the top-level audible notification may identify a plurality of categories of audible content, where each respective category is selectable by the user using a corresponding voice command to explore additional details of the respective category. In the example of FIG. 4, the categories of audible content may be "3 emails," "10 deals," and "5 books recommendations," and each of these categories may be selected by the user using a corresponding voice command (e.g., "show me emails," "show me deals," and "show me books"). Although level 1 of FIG. 4 is described as being the "top level" in the hierarchy, in some embodiments, another level such as level 0 or level 2 may be the "top level." In some cases, the top level refers to a level that is to be outputted in response to a request for notifications.

At block 508, the audio assistant 404 receives a voice command from the user in response to the top-level audible notification presented to the user. The voice command may identify the user's selection of one of the plurality of categories identified by the top-level audible notification to explore additional details of the selected category. In the example of FIG. 4, a voice command that says, "show me emails" may indicate that the user is interested in further exploring the 3 emails, a voice command that says, "show me deals" may indicate that the user is interested in further exploring the 10 deals, and a voice command that says, "show me books" may indicate that the user is interested in further exploring the 5 books recommendations.

At block 510, the audio assistant 404 outputs a lower-level (or more specific) audible notification via the loudspeaker in response to the voice command from the user. As discussed in connection with block 506, the lower-level audible notification may refer to some or all of the notifications at a level that is lower (e.g., level 2) in the hierarchy of notifications shown in the example of FIG. 4 than another level (e.g., level 1). The lower-level audible notification may identify additional audible content associated with the selected category. For example, the lower-level audible notification may include single notifications (e.g., "$20 deal on Titleist Pro V1 golf balls" and/or groups of notifications ("3 deals on headphones" and "5 deals on shoes"), as illustrated in FIG. 4.

At block 512, the audio assistant 404 transmits, to the notification server, an indication that the user has selected the category (e.g., using the voice command at block 508) over one or more other categories identified by the top-level audible notification. In the example of FIG. 4, the user, using the voice command "show me deals," selects the 10 deals and not the 3 emails or the 5 book recommendations.

At block 514, the audio assistant 404 receives, from the notification server, modified notification data associated with the user. The modified notification data can be different from the notification data previously received from the notification server (e.g., at block 502). The notification data may be modified based on the indication transmitted to the notification server at block 512. The modification process is described in greater detail below with reference to FIG. 8.

At block 516, the audio assistant 404 outputs, based on the modified notification data associated with the user, a modified top-level audible notification via the loudspeaker. The modified top-level audible notification may identify at least a portion of the additional audible content previously identified by the lower-level audible notification (e.g., outputted at block 510). In the example of FIG. 4, any of the notifications or categories of notifications initially presented at level 2 (e.g., the golf ball, the 3 deals on headphones, or the 5 deals on shoes) may be moved up to level 1.

Figure 6:
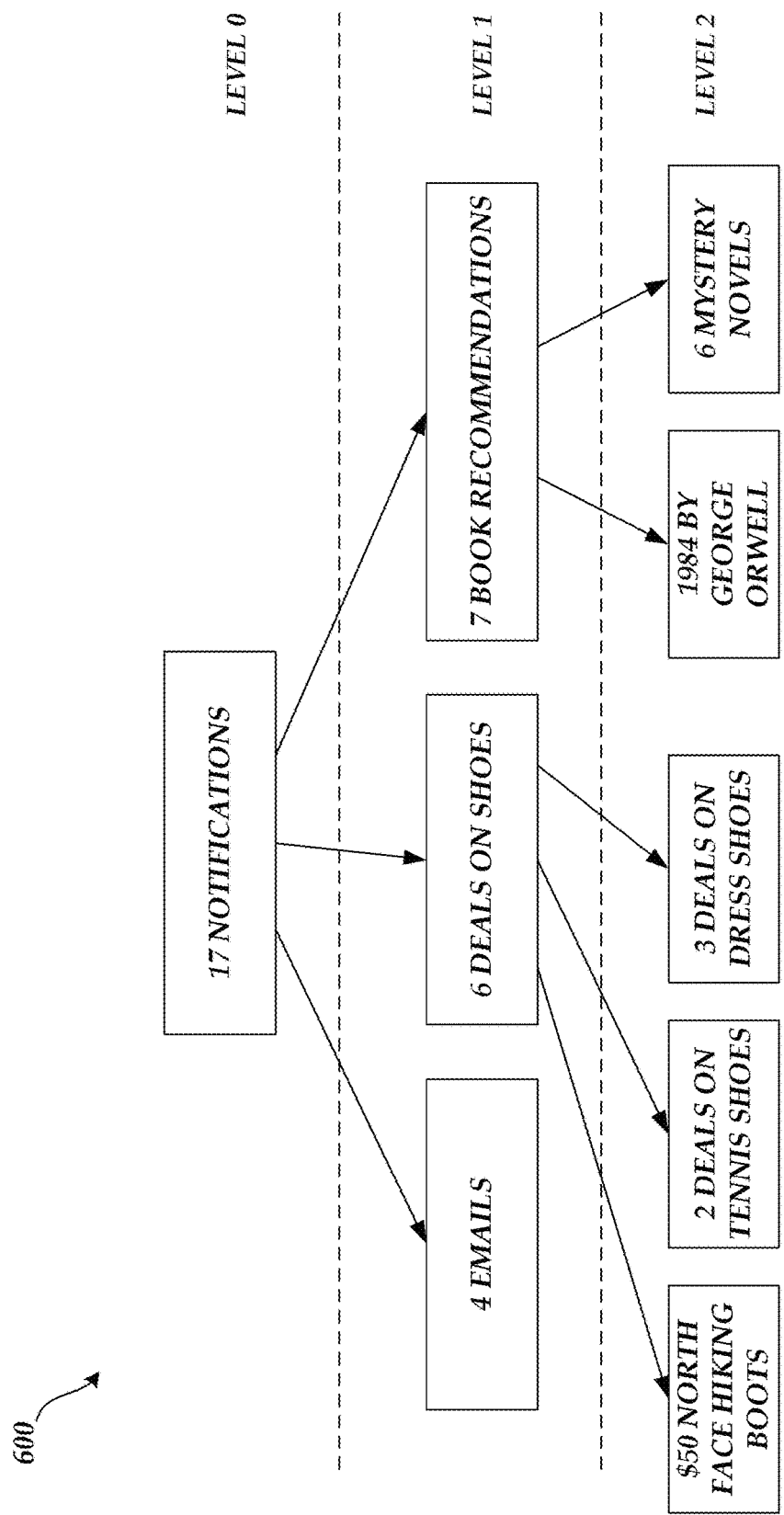
FIG. 6 is a block diagram illustrating another example notification structure in accordance with aspects of the present disclosure.

The modified top-level audible notification may identify one of a plurality of sub-categories identified by the lower-level audible notification previously outputted in response to the voice command. For example, based on the voice command corresponding to the 5 deals on shoes, at the next opportunity to present notifications for the user (or at a subsequent opportunity), the audio assistant 404 may include any deals on shoes at the top level (e.g., level 1 in the example of FIG. 4) instead of at one of the lower levels (e.g., level 2 or 3), as shown in the example of FIG. 6, so that the deals on shoes are more easily accessible by the user. Accordingly, the time it takes for the user to reach the deals on shoes can be reduced. For example, a delay between the time at which the user instructs the audio assistant 404 to provide notifications (or another indication to output audible notifications is determined such as based on detection of the user's presence in the vicinity of the audio assistant 404, for example, within wireless transmitter range) and the time at which the user's desired notification is outputted (e.g., the deals on shoes) is reduced by including the notification "deals on shoes" at level 1 instead of level 2. Such receipt of user instruction or determination of the indication to output audible notifications may occur, although not shown in FIG. 5, prior to or immediately prior to block 516. Alternatively or additionally, the number of voice commands (or touchscreen commands or other inputs in the visual notification context) inputted by the user to reach the deals on shoes can be reduced. For example, prior to the modification of the notification data, the "deals on shoes" notification was included at level 2, and the user may first select the "10 deals" notification, then select the "deals on shoes" notification in order to hear about the deals on shoes (two selections or voice commands to reach the desired outcome). In contrast, subsequent to the modification of the notification data, the "deals on shoes" notification can be included at level 1 and thus presented to the user at the top level. Thus, after the modification, the user may select the "deals on shoes" notification to hear about the deals on shoes (one selection or voice command to reach the desired outcome).

In the routine 500, one or more of the blocks shown in FIG. 5 may be removed (e.g., not performed) and/or the order in which the routine 500 is performed may be switched. For example, in some embodiments, blocks 514 and 516 may be performed by a user device other than the audio assistant 404, such as a desktop computer or tablet computer. For example, the network platform 110 may, after the lower-level audio notification is outputted on the audio assistant 404, receive a request for notification data associated with the user via a browser or mobile application executing on the user device 102 over the network 104. The user device 102 may be configured to output visual notifications via a graphical user interface (GUI) of the browser or mobile application using the notification data. In response to such a request, the network platform 110 may transmit the modified notification data to the user device 102 such that the visual notifications outputted via the GUI reflects the modification performed in response to the user's selection (e.g. at block 508) via the audio assistant 404.

In some embodiments, additional blocks may be added to the routine 500. For example, the audio assistant 404 may receive a second voice command from the user in response to the lower-level audible notification, and facilitate an action identified by the second voice command. The facilitated action may include outputting another audible notification associated with a sub-category identified by the lower-level audible notification, or completing a purchase of an item identified by the lower-level audible notification. The embodiments of the present disclosure are not limited to or by the example shown in FIG. 5, and other variations may be implemented without departing from the spirit of this disclosure.

Example Updated Hierarchical Structure of Notifications

With reference now to FIG. 6, an example notification structure 600 will be described. The notification structure 600 may reflect the changes made to the notification structure 300 in response to the user command (e.g., at block 508 of FIG. 5) and may further include additional notifications generated since the generation of the notification structure 300. As shown in the example of FIG. 6, the notification structure 600 includes 17 notifications total (level 0). The 17 notifications may be divided into three groups of notifications at level 1 (e.g., 4 email, 6 deals on shoes, and 7 book recommendations). Compared to the notification structure 300 of FIG. 3, the notification structure 600 may include, at level 1, one additional email notification, two additional book recommendations, and 6 deals on shoes instead of 10 deals. For example, based on the user's voice command to explore the deals on shoes (presented at level 2), this type of notification was moved from level 2 to level 1. In some embodiments, such a modification may occur upon determining that the type of notifications was explored more than a threshold number of times. Additionally or alternatively, the user's voice command to explore a given notification or a given category of notifications can increase the probability that such notification or category of notifications will be activated by the user, and the notification structure can be re-generated based on the updated probabilities of all notifications generated for the user.

Example Interactions Based on Updated Hierarchical Structure of Notifications

Figure 7:
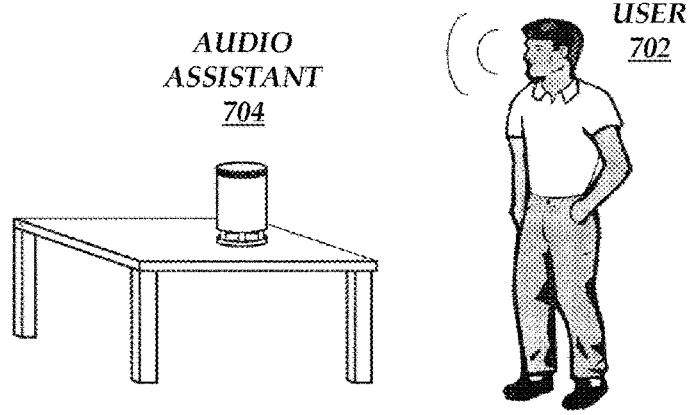
FIG. 7 illustrates another example of interactions between a user and an audio assistant in accordance with aspects of this disclosure.

With reference now to FIG. 7, an example interaction 700 between a user 702 and an audio assistant 704 will be described. As illustrated in FIG. 7, when the users requests to hear his notifications (e.g., after some time has passed since his request in FIG. 4), the top-level composite notification in this example now includes "deals on shoes" instead of "deals." Thus, in this example, the delay from the time at which the user requests to hear his notifications to the time at which the notification likely desired by the user (e.g., deals on shoes) is presented to the user can be reduced with respect to the example of FIG. 4. In the example of FIG. 4, the user had to input three voice commands to hear about the deals on shoes ("show me my notifications," "show me deals", and "show me shoes") whereas in the example of FIG. 7, the user had to input only two voice command to hear about the deals on shoes ("show me my notifications" and "show me shoes").

Composite Notification Modification Routine

Figure 8:
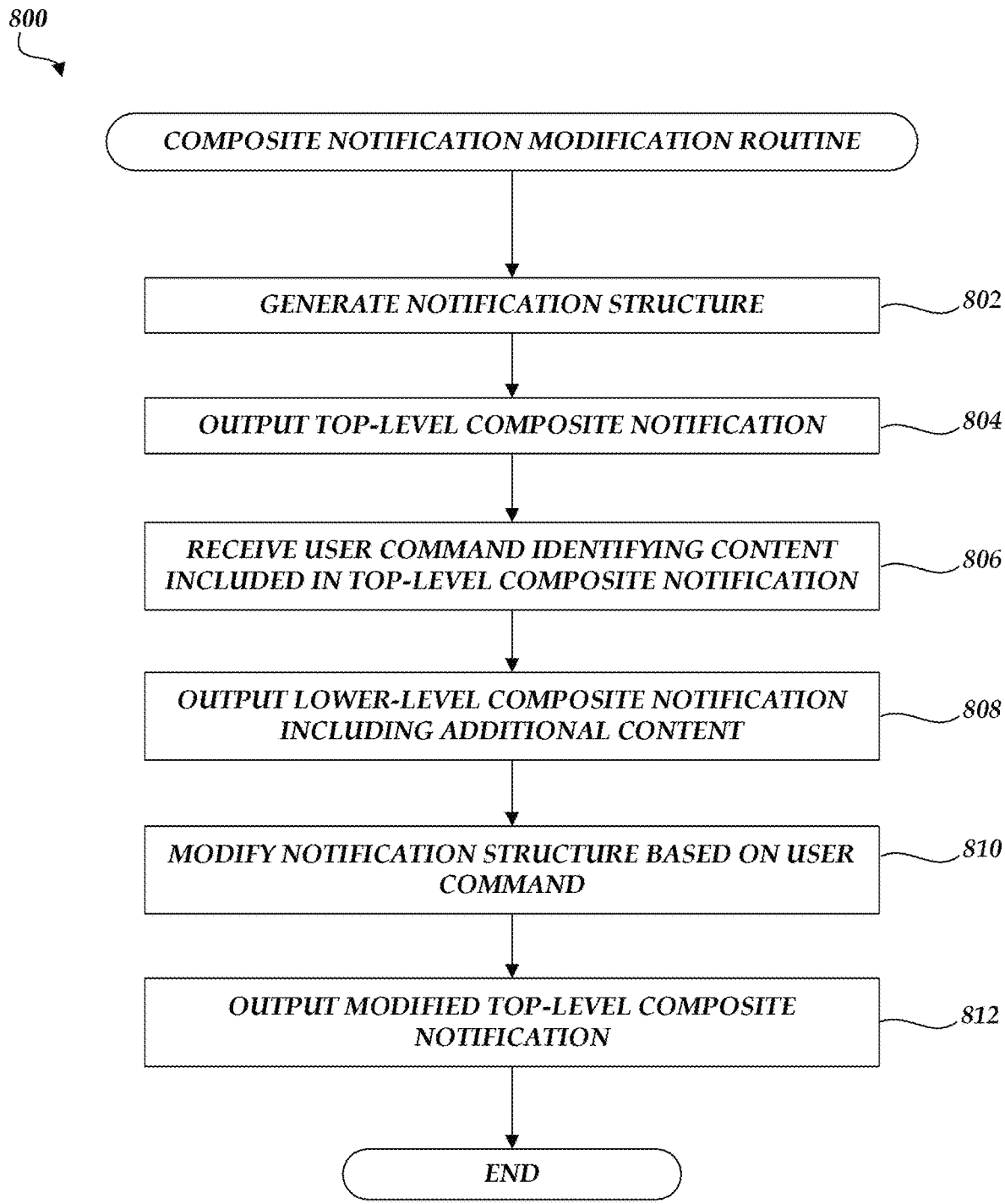
FIG. 8 illustrates an example composite notification modification routine in accordance with aspects of this disclosure.

With reference now to FIG. 8, an example composite notification modification routine 800 will be described. The example routine 800 may be carried out, for example, by the notification service 150 of FIG. 1 (or one or more components thereof). The routine 800 illustrates an example algorithm that may be programmed, using any suitable programming environment or language, to create machine code capable of execution by a CPU or microcontroller of the notification service 150. For convenience, the steps of the example routine 500 are described as being performed by the notification service 150.

At block 802, the notification service 150 generates a notification structure comprising a plurality of notifications associated with a user based on one or more interactions of the user with a user device associated with the user. An example of such a notification structure is illustrated in FIG. 6.

At block 804, the notification service 150 outputs, based on the notification structure, a top-level composite notification for presentation to the user on the user device. The top-level composite notification may include a plurality of categories of content. For example, the top-level composite notification may be transmitted to the user device 102 for presentation to the user. In some embodiments, the top-level composite notification may be transmitted to the user device 102 in response to a notification request received via a browser or mobile application executing on the user device 102. Such a top-level composite notification may be output on a graphical user interface (GUI) of the browser or mobile application as a visual notification (e.g., via an interactive notification hub that can display notifications from multiple sources).

At block 806, the notification service 150 receives a user command in response to the top-level composite notification. The user command may identify one of the plurality of categories included in the top-level composite notification. For example, the user command may be a voice command (e.g., "show me deals") that includes a portion of the top-level composite notification ("20 deals"). In some embodiments, the user command may be a text or another type of data that corresponds to the voice command received and processed by the user device 102 (e.g., the user's voice command converted into a string of characters). As another example, the user command may be the user's activation of a portion of the GUI that corresponds to a portion of the top-level composite notification by clicking with a mouse or touching a touch-sensitive portion of the display screen. In some embodiments, the user command may be a text or another type of data that corresponds to the user's activation of a portion of the GUI that corresponds to a portion of the top-level composite notification (e.g., location of the display screen clicked or touched by the user).

At block 808, the notification service 150 outputs, based on the category identified by the user command, a lower-level composite notification for presentation to the user on the user device. The lower-level composite notification may include additional content associated with the identified category. For example, the top-level composite notification may include the notifications at level 1 of FIG. 9 (e.g., "20 deals, 4 books recommendations, and 5 other notifications" in an audible notification or the visual notification shown in the example of FIG. 10), and the lower-level composite notification may include the deals at level 2 of FIG. 9 (e.g., "$100 deal on the gold coin, 10 deals on shoes, and 9 deals on handheld tools" in an audible notification or a corresponding visual notification displayed via a GUI).

At block 810, the notification service 150 modifies the notification structure such that generating another top-level composite notification based on the modified notification structure causes said another top-level composite notification to include at least some of the additional content included in the lower-level composite notification. For example, the user's interaction with the notifications presented to the user or with the network platform 110 may indicate that a particular content is more important to the user. For example, the notification service 150 may determine such an indication based on the user's command to explore the particular content and/or the number or frequency of such commands. In other embodiments, the notification service 150 may determine such an indication based on an explicit request from the user (e.g., inputted via a user interface that allows the user to provide explicit indications of whether the user likes or dislikes a given notification or category of notifications). For example, the user may activate a user interface element associated with a given notification to signal that the user likes (or dislikes) the given notification. In response to determining such an indication, the notification service 150 may modify the notification structure such that the user can more easily access the particular content (e.g., by allowing the notification associated with the particular content to occupy a larger percentage of the display screen, by presenting the notification associated with the particular content earlier, by reducing the number of expansions needed to reach the notification associated with the particular content, etc.). In some embodiments, the notification service 150 may record the user actions (e.g., notification selected/expanded/activated by the user), and modify the notification structure such that the time (or the number of clicks or voice commands) it takes for the user to reach the recorded actions can be reduced.

In some embodiments, the notification service 150 modifies the notification structure based on a determination that the identified category has been selected by the user a threshold number of times. For example, based on a determination that the deals on shoes have been explored by the user 3 times, the notification service 150 may modify the notification structure such that the deals on shoes appear at a higher level in the notification structure and/or such that the deals on shoes are presented to the user in a way that is more accessible (e.g., sooner, in a bigger area, in a less time-consuming manner, such that a fewer number of clicks/commands is required, etc.).

In some cases, the notification service 150 modifies the notification structure based on the size threshold associated with the user device 102. For example, the notification service 150 may identify a set of categories for inclusion in the top-level composite notification. However, the notification service 150 may determine that the set of categories collectively exceeds a size threshold associated with the user device (e.g., the limit on the number of notifications that can be included in a single visual notification based on the display screen size, the limit on the length of a single audible notification presented to the user, and the like). In such a case, the notification service 150 may combine at least two categories of the set of categories into a single category and output the top-level composite notification comprising at least the single category. For example, 4 emails, 2 deals on tennis shoes, 3 deals on dress shoes, and 7 book recommendations may be grouped into 4 emails, 5 deals on shoes, and 7 book recommendations. Such modification may be made based on the number of syllables that can be included in a single audible composite notification or the number of seconds that can be utilized by a single audible composite notification, in the event that the user device 102 is configured to output audible notifications. Alternatively, such modification may be made based on the display screen size or based on the number of notifications that can be fitted in the GUI, in the event that the user device 102 includes a display.

At block 812, the notification service 150 outputs a modified top-level composite notification generated based on the modified notification structure. For example, in response to another request from the user device 102, the modified top-level composite notification may be transmitted to the user device 102 and presented on the GUI in a way that reflects the modification performed in response to the user command received at block 806.

In some embodiments, specific portions of the composite notification presented in a GUI may be associated with respective links including unique identifiers. Such unique identifiers may be used to determine exactly which portion of the composite notification that the user activated. For example, the notification service 150 may receive an indication that the user has activated a hyperlink associated with a portion of the content included in the top-level (or lower-level) composite notification, where the top-level (or lower-level) composite notification is presented on the user device 102 in an email message. In response to the indication, the notification service 150 may output another composite notification corresponding to the hyperlink for presentation in a browser or mobile application executing on the user device 102.

In the routine 800, one or more of the blocks shown in FIG. 8 may be removed (e.g., not performed) and/or the order in which the routine 800 is performed may be switched. In some embodiments, additional blocks may be added to the routine 800. The embodiments of the present disclosure are not limited to or by the example shown in FIG. 6, and other variations may be implemented without departing from the spirit of this disclosure.

Example Hierarchical Structure of Notifications

Figure 9:
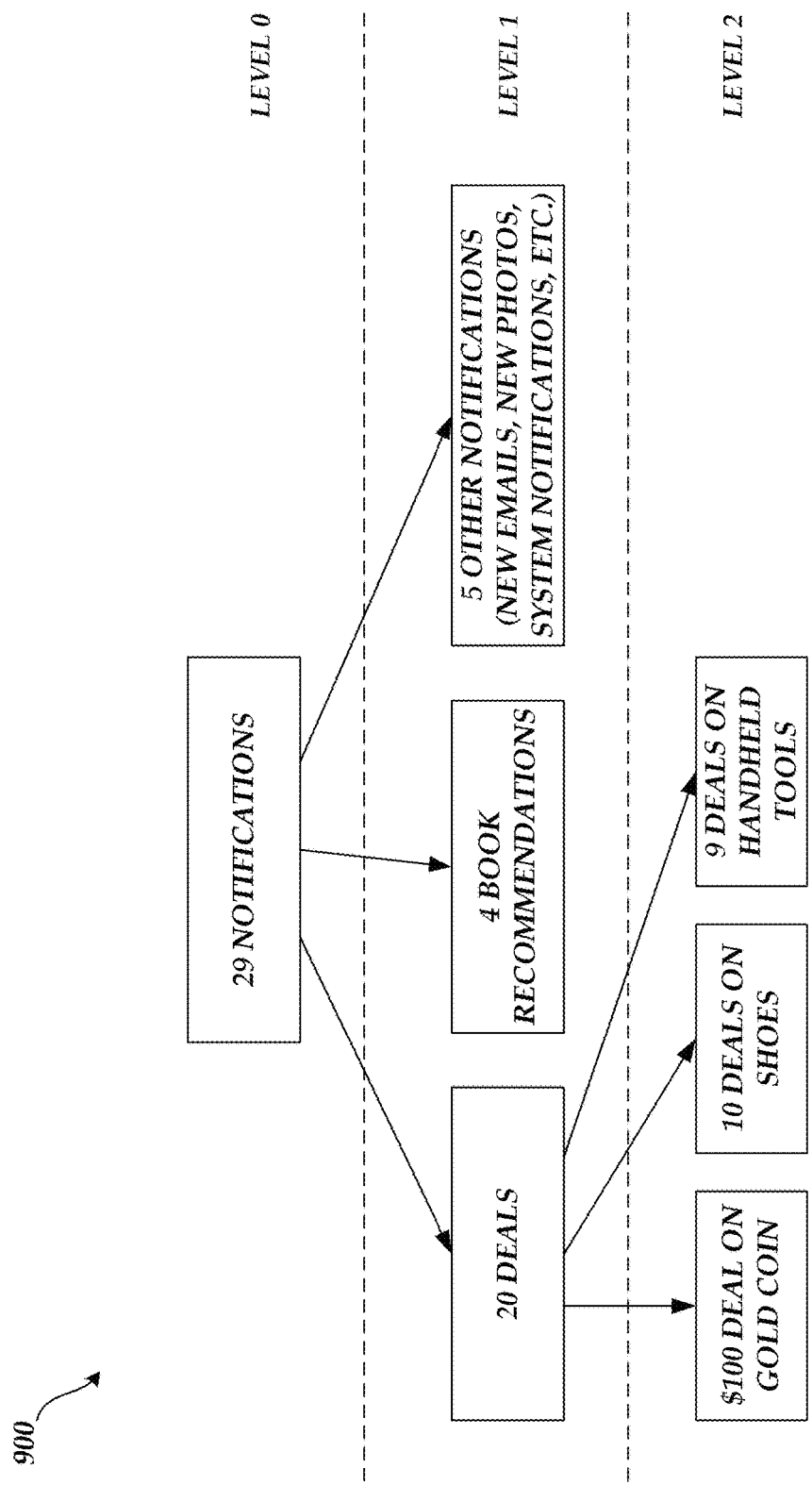
FIG. 9 is a block diagram illustrating another example notification structure in accordance with aspects of the present disclosure.

With reference now to FIG. 9, an example notification structure 900 will be described. The notification structure 900 includes multiple levels of notifications organized in a hierarchical fashion. For example, the notification structure 900 includes 29 notifications total (level 0). The 29 notifications may be divided into three groups of notifications at level 1 (e.g., 20 deals, 4 book recommendations, and 5 other notifications). The 20 deals may further be divided into three groups of notifications at level 2 (e.g., $100 deal on the gold coin, 10 deals on shoes, and 9 deals on handheld tools). The ways in which notifications are presented based on the notification structure 900 is illustrated in FIGS. 10 and 11.

Example User Interface

Figure 10:
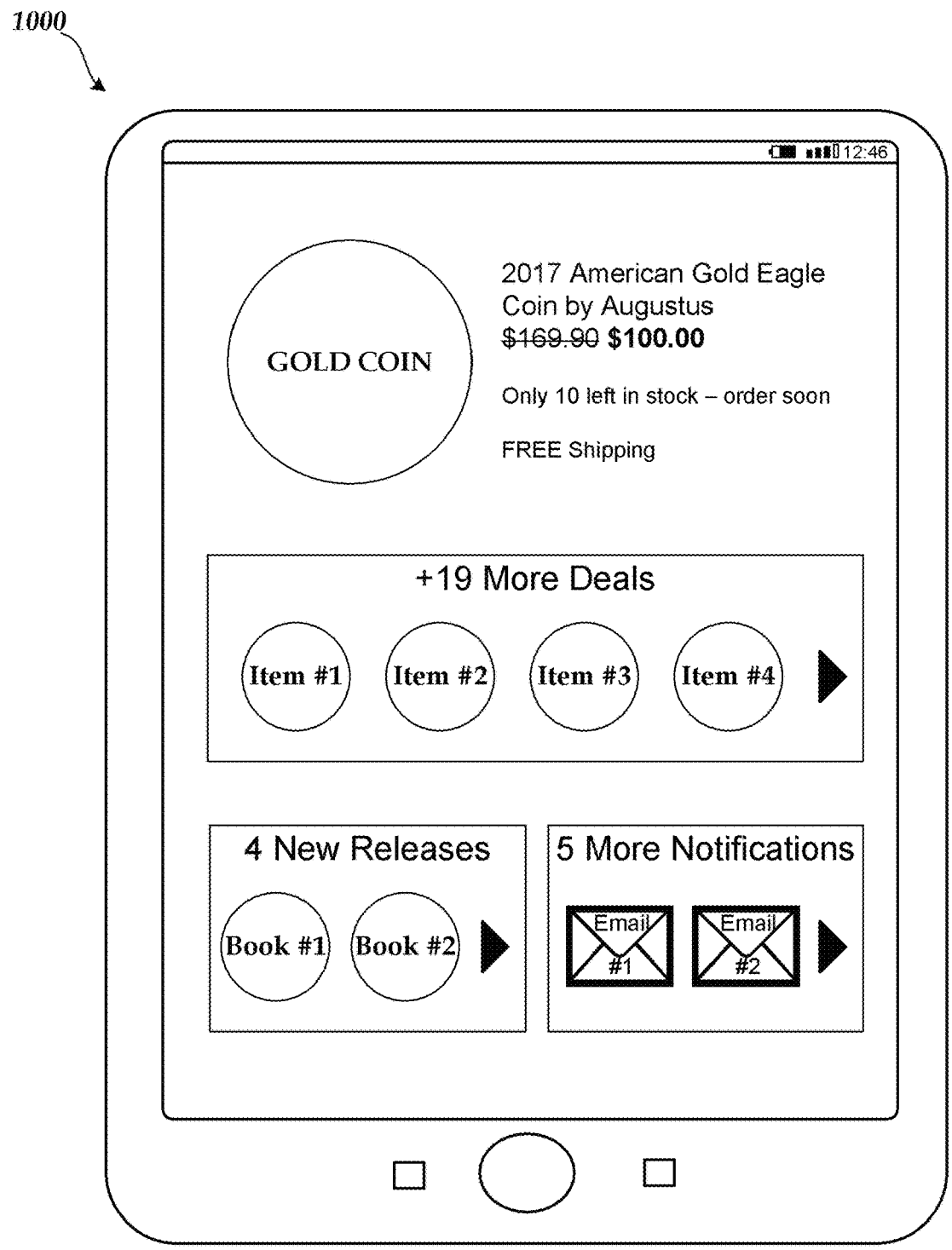
FIG. 10 illustrates an example user interface displayed on a display device in accordance with aspects of this disclosure.

FIG. 10 illustrates an example user interface 1000 that may be presented on a display device. As shown, the user interface 1000 shows a visual composite notification including the notifications at level 1 of the notification structure 900. In some embodiments, the notification structure 900 further includes the size and location associated with the individual notifications or categories of notifications included in the notification structure 900. For example, the notification structure 900 may specify that upon the user's selection of the "20 deals," the $100 deal on the gold coin is to occupy the top third of the display screen, the 19 other deals are to occupy the middle third of the display screen, the 4 books recommendations are to occupy the left half of the bottom third of the display screen, and the 5 other notifications are to occupy the right half of the bottom third of the display screen, as illustrated in FIG. 10. The right arrows shown in FIG. 10 may be used to scroll through the notifications that are not currently displayed.

Figure 11:
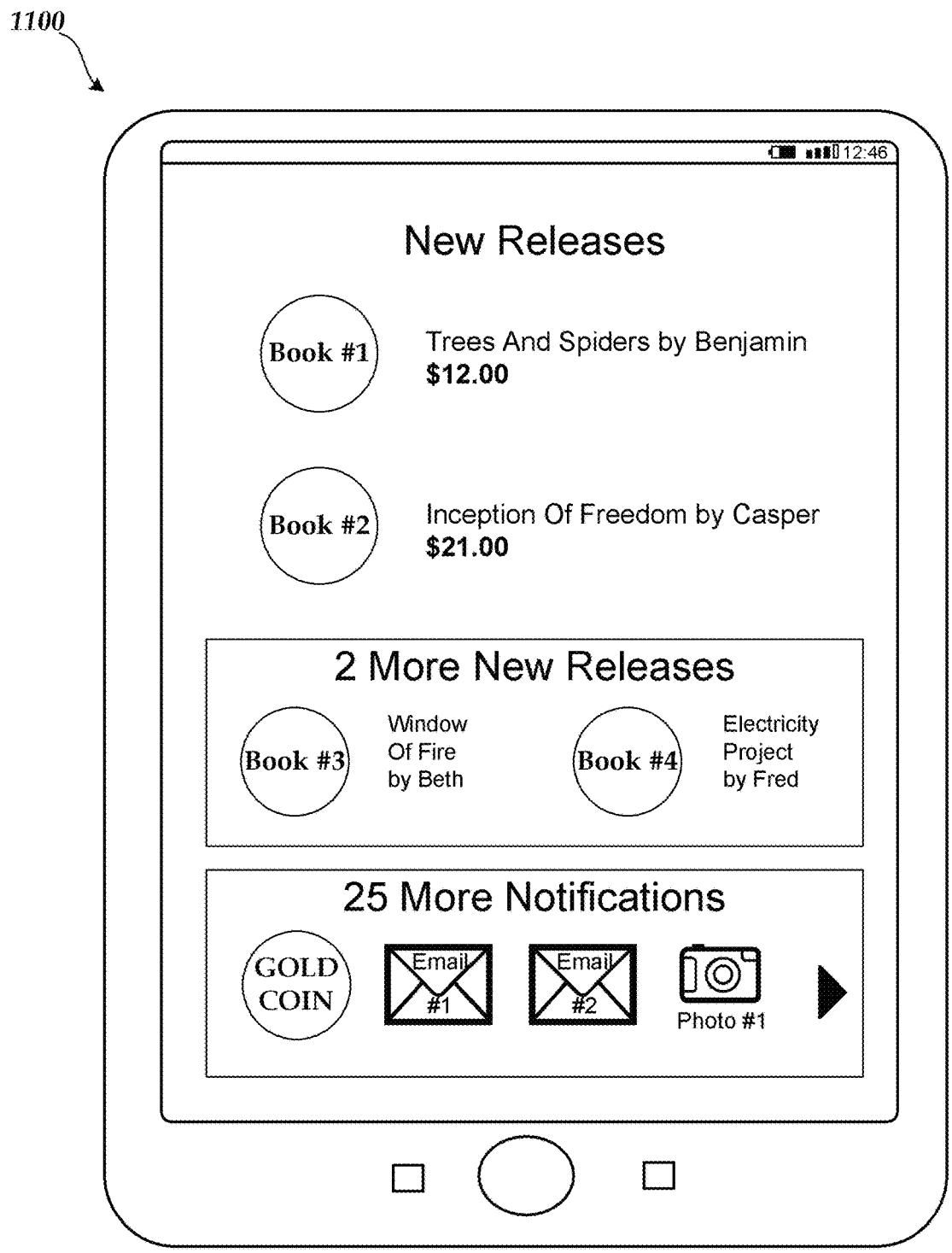
FIG. 11 illustrates another example user interface displayed on a display device in accordance with aspects of this disclosure.

FIG. 11 illustrates an example user interface 1100 that may be presented on the display device in response to the user's selection of "4 New Releases" from the user interface 1000. As shown in the example of FIG. 11, books #1 and #2 may be shown in detail in the top half of the display screen. Two additional new releases may be displayed in the top half of the bottom half of the display screen, and the remaining notifications at level 1 may be displayed in the bottom quarter of the display screen. As shown in the examples of FIGS. 10 and 11, in some embodiments, the most important notification(s) occupy the largest area(s) on the display screen. For example, the notification determined to be most likely to be activated by the user (e.g., determined based on the user's prior actions) occupy the largest percentage of the display screen (e.g., the $100 deal on the gold coin). The remaining notifications may be sized such that the percentages of the display screen occupied by the notifications are commensurate with their relative predicted importance to the user. The sizes of the notifications may be adjusted based on how the user interacts with the individual notifications. For example, if a notification is activated sufficiently frequently (e.g., once, twice, or a threshold number of times), the size of the notification may be increased, thereby facilitating the user's activation of the desired notification via the graphical user interface. As another example, if a notification presented at a lower level is activated sufficiently frequently (e.g., once, twice, or a threshold number of times), the notification may be moved up to a higher level (e.g., from level 2 to level 1 in the example of FIG. 9), thereby reducing the delay from the time at which the notifications are first presented to the user to the time at which the user activates the desired notification.

Dynamic Adjustment of Screen Real Estate Dedicated to Notifications

Figure 12:
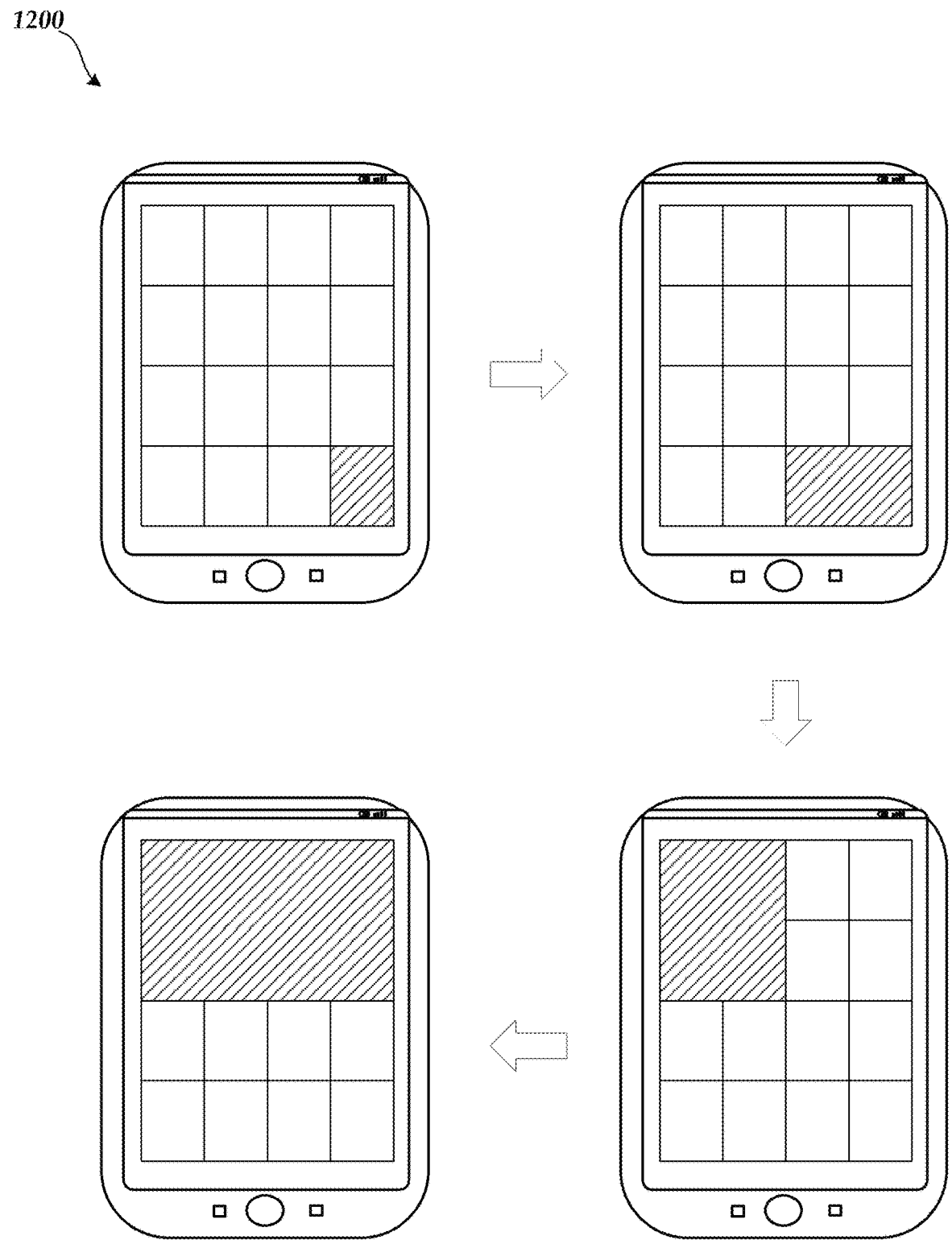
FIG. 12 is a block diagram illustrating an example process of adjusting the portion of a display screen occupied by a given notification in accordance with aspects of this disclosure.

FIG. 12 illustrates an example process of adjusting the size and location of the screen area occupied by a given notification or a given type of notification. As shown in the top-left GUI, the shaded $\frac{1}{16}$ of the display screen may initially be dedicated to a given notification or type of notification. Upon detecting user interaction with the given notification or type of notification via the shaded area, the notification service 150 may update the notification structure such that the given notification or type of notification occupies a larger area, as shown in the top-right GUI. As additional user interaction is detected, the notification service 150 may update the notification structure such that the given notification or type of notification occupies an even larger area that is located closer to the top of the screen, as shown in the bottom-right GUI and the bottom-left GUI. Similarly, the notification service 150 may update the notification structure such that the given notification or type of notification occupies a smaller and/or less prominent location of the display screen based on a reduction in the number of user interactions relative to other notifications presented on the display screen. Although the example of FIG. 12 illustrates how a display area can be divided up among multiple notifications, similar techniques can be utilized to implement division of a displayable area among multiple notifications. For example, the displayable area may be larger than the display area, and the user may utilize scrolling (e.g., to the left, to the right, to the top, to the bottom, etc.) to explore different portions of the displayable area. In some embodiments, all of the notifications presented to the user fits in the screen area shown in FIG. 12. In other embodiments, at least a portion of the notifications does not entirely fit in the screen area and is not initially shown to the user. In such embodiments, such portion of the notifications may be displayed in the GUI upon the user scrolling to the corresponding location of the portion in the displayable area.

Generation of Composite Notifications Using Supervised Machine Learning

Figure 13:
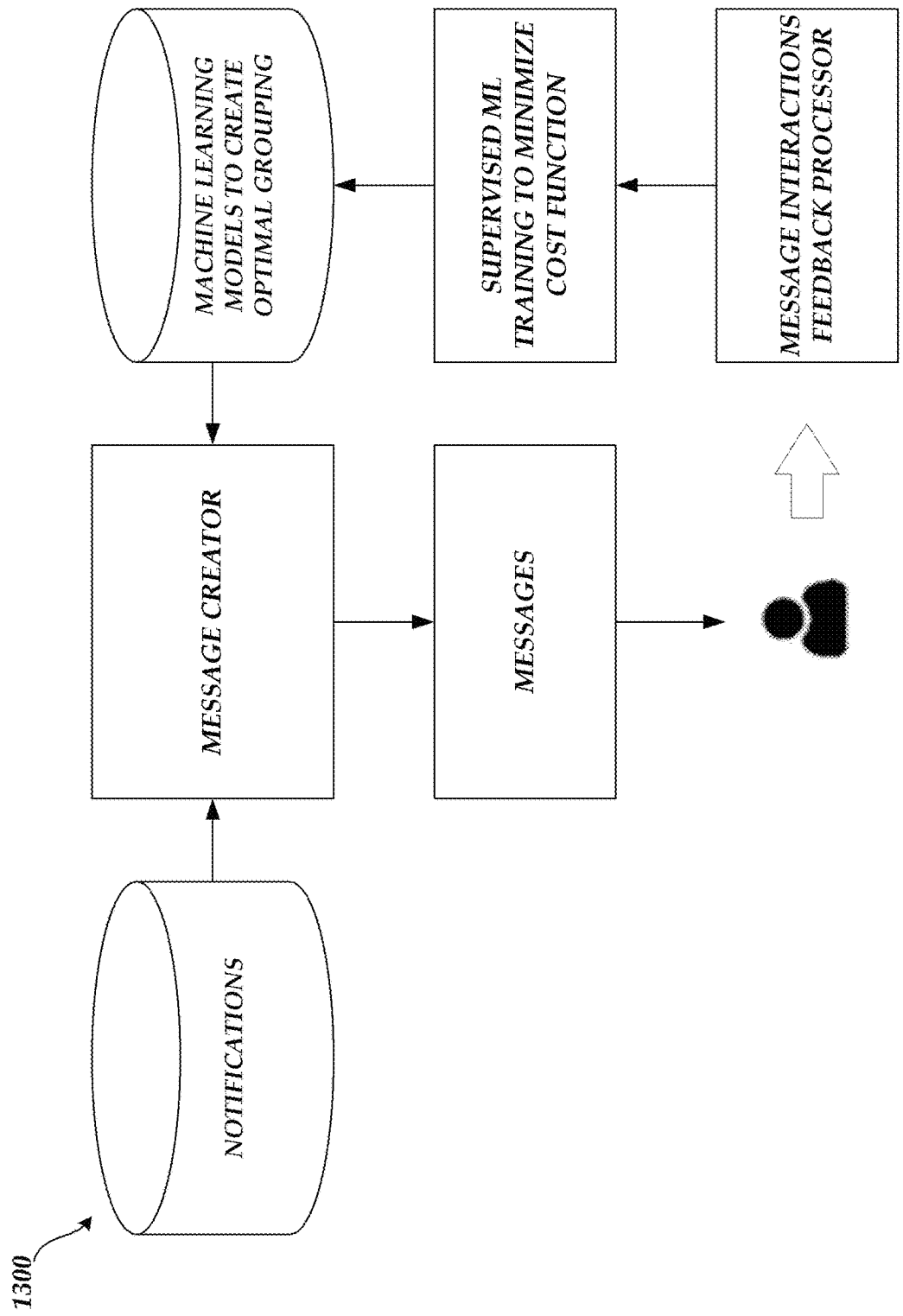
FIG. 13 is a block diagram illustrating an example algorithm of generating and adjusting the hierarchical structure of notifications in accordance with aspects of this disclosure.

FIG. 13 illustrates a block diagram 1300 that illustrates an example algorithm that may be utilized by the notification service 150 to generate and adjust the hierarchical structure of notifications. In some embodiments, there may be N notifications that are organized hierarchically based on their taxonomy. For example, shoes of brand A and brand B may be categorized under the "shoes" category, which may further fall under the "apparel" category. When presenting one or more notifications to a user, the notification service 150 may try to reduce the time spent by the user browsing the notifications to get to the specific recommendation that the user wishes to consume.

The notification service 150 may present the notifications in a specific aggregated format based on the user interaction metrics. For example, based on the metrics, the notification service 150 may train a machine learning model to reduce the cost of next interaction of the user with the notification system. The cost may be defined with respect to the context in which the interactions are consumed. For example, in the email context, the cost may be the number of clicks the user needs to perform in order to reach the notification that he wishes to consume. In the voice context, the cost may be the time spent by the user in interacting with the system (e.g., via the audio assistant 404) before reaching the notification(s) that he wishes to consume.

The notifications may be presented as individual notifications and/or as one or more composite notifications that each include multiple notifications grouped under a taxonomy or category based on the hierarchical structure (e.g., notification structure 300). The machine learning model may be trained to generate, group, and present notifications in a way that reduces the expected cost of the message(s) or notification(s). The user may interact with the initial set of notifications or groups of notifications and can either consume a notification directly or expand a composite notification to be presented with additional notifications and/or groups of notifications associated with the composite notification. The user may continue to explore the notifications or composite notifications until the user either discards the presented notifications or consumes a specific notification.

The notification service 150 may automatically combine multiple specific notifications into composite notifications automatically based on the taxonomy. The machine learning model trained to optimize or improve the cost can also optimize on the taxonomy to be used for grouping notifications into composite notifications. For example, the machine learning model can provide insight into whether the notifications should be first grouped by the type of notification (e.g., deals, new book releases, etc.) or by category (e.g., shoes, books, etc.). The supervised machine learning model may take as input the taxonomy to group, and automatically create composite messages or notifications. In some cases, composite messages or notifications cannot be consumed and should be expanded to specific notifications that the user can consume directly. In other cases, composite messages or notifications can be consumed directly.

If NC1=(cost of user discarding the entire notification after hearing the first notification or seeing the first rendered hierarchy), C1=(cost of user consuming the notification in the first rendered hierarchy), NCX=(cost of user discarding the entire notification after hearing the X-th notification or seeing the X-th rendered hierarchy), and CX=(cost of user consuming the notification in the X-th rendered hierarchy), some example values of NC1, C1, NC2, C2, NC3, and C3 may be: NC1=100; C1=0; NC2=100; C2=10; NC3=100; and C3=20. In other embodiments, other cost values may be used.

In some embodiments, the notification service 150 may consider one or more of (i) the order of taxonomy, (ii) the time the user consumes the notification, or (iii) channel in which the notification is consumed, for generating and updating the notification hierarchy.

The cost of consuming a notification may be the amount of time/effort that the user spends in consuming the message or notification (e.g., the number of clicks, the amount of time spent, the number of words spoken, etc.). The definition of cost may depend on the channel and/or other goals. For example, the cost may be calculated as: (cost)=NC1*discard in phase 1+C1*consume notification in phase 1+(if the user continues to phase 2 by interacting with the notification) NC2*discard in phase 2+C2*consume recommendation in phase 2, + . . . for K steps.

The machine learning model may use one or more features in the following set of features for training the supervised model to reduce the expected cost per user: (i) notifications and their attributes; (ii) user-level features and their engagement affinities for various channels; or (iii) expected probability for user to like the notification (which can be trained using independent machine learning models).

Example Embodiments

EE 1. A system for audibly outputting a notification to a user, the system comprising: an audio device in network communication with the server, the audio device comprising: a microphone configured to receive audible commands from a user; a loudspeaker configured to output audible notifications to the user; a hardware processor; and a memory storing instructions. The instructions may, when executed by the hardware processor, configure the hardware processor to: receive, from a notification server over a network, notification data associated with the user; determine an indication to output audible notifications associated with the user; output, based at least on the notification data associated with the user, a top-level audible notification via the loudspeaker, the top-level audible notification identifying a plurality of categories of audible content, each respective category selectable by the user using a corresponding voice command to explore additional details of the respective category; receive a first voice command from the user in response to the top-level audible notification, the first voice command identifying the user's selection of one of the plurality of categories identified by the top-level audible notification to explore additional details of the selected category; in response to the first voice command, output a lower-level audible notification via the loudspeaker, the lower-level audible notification identifying additional audible content associated with the selected category; transmit, to the notification server over the network, an indication of the user's selection of the category over one or more other categories identified by the top-level audible notification; receive, from the notification server over the network, modified notification data associated with the user, the modified notification data being different than the notification data previously received from the notification server; subsequent to outputting the lower-level audio notification, determine another indication to output audible notifications associated with the user; and output, based at least on the modified notification data associated with the user, a modified top-level audible notification via the loudspeaker, the modified top-level audible notification identifying at least a portion of the additional audible content previously identified by the lower-level audible notification such that a delay associated with outputting the identified portion is reduced based at least on the use of the modified notification data.

EE 2. The system of EE 1, wherein the modified top-level audible notification identifies one of a plurality of sub-categories identified by the lower-level audible notification previously outputted in response to the first voice command.

EE 3. The system of EE 1, wherein the notification server is configured to: subsequent to outputting the lower-level audio notification on the audio device, receive a request for notification data associated with the user via a browser or mobile application executing on a user device in network communication with the notification server, the user device configured to output, based at least on the notification data, visual notifications via a graphical user interface (GUI) of the browser or mobile application; and transmit the modified notification data to the user device such that the visual notifications outputted via the GUI reflects the modification performed in response to the user's selection via the audio device.

EE 4. The system of EE 1, wherein the instructions, when executed by the hardware processor, further configure the hardware processor to receive a second voice command from the user in response to the lower-level audible notification, and facilitate an action identified by the second voice command, the action comprising outputting another audible notification associated with a sub-category identified by the lower-level audible notification, or completing a purchase of an item identified by the lower-level audible notification.

EE 5. A method for outputting a notification to a user, the method comprising: generating a notification structure comprising a plurality of notifications associated with a user based at least on one or more interactions of the user with a user device associated with the user; outputting, based at least on the notification structure, a top-level composite audible notification for presentation to the user via a loudspeaker of the user device, the top-level composite audible notification identifying a plurality of categories of audible content; receiving a first command in response to the top-level composite audible notification, the first command identifying one of the plurality of categories included in the top-level composite audible notification; outputting, based at least on the category identified by the first command, a lower-level composite audible notification for presentation to the user via the loudspeaker of the user device, the lower-level composite audible notification identifying additional audible content associated with the identified category; and modifying the notification structure such that generating another top-level composite audible notification based at least on the modified notification structure causes said another top-level composite audible notification to include at least some of the additional audible content included in the lower-level composite audible notification.

EE 6. The method of EE 5, further comprising receiving a notification request from the user device, the user device configured to generate the notification request in response to a voice command received via an audio user interface provided by the user device.

EE 7. The method of EE 6, further comprising outputting a modified top-level composite audible notification for presentation to the user on the user device such that the modified top-level composite audible notification outputted via the audio user interface reflects the modification performed in response to the first command.

EE 8. The method of EE 5, further comprising modifying the notification structure based at least on a determination that the identified category has been selected by the user a threshold number of times.

EE 9. The method of EE 5, wherein the structure is a tree structure that includes nested content corresponding to the plurality of notifications.

EE 10. The method of EE 5, further comprising: identifying a set of categories for inclusion in the top-level composite audible notification; determining that the set of categories collectively exceeds an audible notification length threshold associated with the user device; combining at least two categories of the set of categories into a single category; and outputting the top-level composite audible notification comprising at least the single category.

EE 11. The method of EE 5, further comprising: identifying a set of categories for inclusion in the top-level composite audible notification; determining that the set of categories collectively exceeds an audible notification length threshold associated with the user device; shortening a length associated with at least one category of the set of categories; and outputting the top-level composite audible notification comprising the at least one category having the shortened length.

EE 12. The method of EE 5, further comprising: receiving an indication that the user has selected a portion of the additional audible content included in the lower-level composite audible notification, wherein the user device is configured to receive a voice command indicative of the selected portion via an audio user interface; and outputting another lower-level composite audible notification corresponding to the selected portion of the additional audible content for presentation on the user device.

EE 13. Non-transitory physical computer storage comprising instructions that, when executed by a hardware processor, configure the hardware processor to: generate a notification structure comprising a plurality of notifications associated with a user based at least on one or more interactions of the user with a user device associated with the user; output, based at least on the notification structure, a first audible or visual notification for presentation to the user on the user device, the first audible or visual notification comprising audible or visual content; receive a first command in response to the first audible or visual notification, the first command identifying a portion of the audible or visual content included in the first audible or visual notification; output, based at least on the portion identified by the first command, a second audible or visual notification for presentation to the user on the user device, the second audible or visual notification comprising additional audible or visual content associated with the identified portion; and modify the notification structure such that generating another audible or visual notification based at least on the modified notification structure causes said another audible or visual notification to include at least some of the additional audible or visual content included in the second audible or visual notification.

EE 14. The non-transitory physical computer storage of EE 13, wherein the instructions, when executed by the hardware processor, further configure the hardware processor to receive a notification request via a browser or mobile application executing on the user device, the user device configured to output the first audible or visual notification and the second audible or visual notification via a graphical user interface (GUI) of the browser or mobile application.

EE 15. The non-transitory physical computer storage of EE 14, wherein the instructions, when executed by the hardware processor, further configure the hardware processor to output an additional visual notification for presentation to the user on the user device such that the additional visual notification outputted via the GUI reflects the modification performed in response to the first command.

EE 16. The non-transitory physical computer storage of EE 13, wherein the instructions, when executed by the hardware processor, further configure the hardware processor to modify the notification structure based at least on a determination that the identified portion has been selected by the user more than a threshold number of times.

EE 17. The non-transitory physical computer storage of EE 13, wherein the instructions, when executed by the hardware processor, further configure the hardware processor to: identify a set of categories for inclusion in the first audible or visual notification; determine that the set of categories collectively exceeds a size threshold associated with the user device; combine at least two categories of the set of categories into a single category; and output the first audible or visual notification comprising at least the single category.

EE 18. The non-transitory physical computer storage of EE 17, wherein the user device comprises a display configured to display visual notifications, the size threshold associated with the user device being a screen size threshold associated with the display of the user device.

EE 19. The non-transitory physical computer storage of EE 17, wherein the user device comprises a loudspeaker configured to output audible notifications, the size threshold associated with the user device being a time limit for which a single composite notification is allowed to be output via the loudspeaker.

EE 20. The non-transitory physical computer storage of EE 13, wherein the instructions, when executed by the hardware processor, further configure the hardware processor to: receive an indication that the user has activated a hyperlink associated with a portion of the additional audible or visual content included in the second audible or visual notification, wherein the second audible or visual notification is presented on the user device as a visual notification in an email message; and output another visual notification corresponding to the hyperlink for presentation in a browser or mobile application executing on the user device.

Other Considerations

It is to be understood that not necessarily all objects or advantages may be achieved in accordance with any particular embodiment described herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure. Further, additional embodiments created by combining any two or more features or techniques of one or more embodiments described herein are also intended to be included herein within the scope of this disclosure.

What is claimed is:

1. A system for audibly outputting a notification to a user, the system comprising:
  an audio device in network communication with the server, the audio device comprising:
    a microphone configured to receive audible commands from a user;
    a loudspeaker configured to output audible notifications to the user;
    a hardware processor; and
    a memory storing instructions that, when executed by the hardware processor, configure the hardware processor to:
      receive, over a network, user-specific notification data associated with the user;
      determine an indication to output audible notifications associated with the user;
      output, based at least on the user-specific notification data associated with the user, a top-level audible notification via the loudspeaker, the top-level audible notification identifying a plurality of categories of user-specific audible content, each respective category selectable by the user using a corresponding voice command to explore additional details of the respective category;
receive a first voice command from the user in response to the top-level audible notification, the first voice command identifying the user's selection of a first category of the plurality of categories identified by the top-level audible notification to explore additional details of the selected category;
in response to the first voice command, output a lower-level audible notification via the loudspeaker, the lower-level audible notification identifying at least a first sub-category of user-specific audible content that is categorized under the first category and selectable in response to the lower-level audible notification;
transmit, over the network, an indication of the user's selection of the first category over one or more other categories of the plurality of categories identified by the top-level audible notification;
receive, over the network, modified user-specific notification data associated with the user, the modified user-specific notification data being different than the user-specific notification data previously received;
subsequent to outputting the lower-level audio notification, determine another indication to output audible notifications associated with the user; and
output, using at least the modified user-specific notification data associated with the user, a modified top-level audible notification via the loudspeaker, the modified top-level audible notification (i) identifying at least the first sub-category of user-specific audible content previously identified by the lower-level audible notification, (ii) causing such that the first sub-category to be selectable to cause presentation of multiple user-selectable items associated with the first sub-category in response to the modified top-level audible notification instead of another lower-level audible notification and thereby reducing a delay associated with outputting the multiple user-selectable items associated with the first sub-category based at least on the use of the modified user-specific notification data, and (iii) no longer identifying the first category such that at least one sub-category categorized under the first category is not accessible by selecting the first category in response to the modified top-level audible notification.

2. The system of claim 1, wherein the lower-level audible notification identifies one or more additional sub-categories of user-specific audible content that are each selectable by the user to cause presentation of user-selectable items.

3. The system of claim 1, further comprising a notification server that is configured to:
subsequent to outputting the lower-level audio notification on the audio device, receive a request for user-specific notification data associated with the user via a browser or mobile application executing on a user device in network communication with the notification server, the user device configured to output, based at least on the user-specific notification data, visual notifications via a graphical user interface (GUI) of the browser or mobile application; and
transmit the modified user-specific notification data to the user device such that the visual notifications outputted via the GUI reflects the modification performed in response to the user's selection via the audio device.

4. The system of claim 1, wherein the instructions, when executed by the hardware processor, further configure the hardware processor to:
receive a second voice command from the user in response to the lower-level audible notification; and
facilitate an action identified by the second voice command, the action comprising outputting another audible notification associated with a sub-category identified by the lower-level audible notification, or completing a purchase of an item identified by the lower-level audible notification.

5. A method for outputting a notification to a user, the method comprising:
accessing, from a storage device storing user data associated with a plurality of users, first user data associated with a first user of the plurality of users, wherein the first user data indicates at least one or more prior actions of the first user;
generating, based at least on the first user data associated with the first user, a plurality of user-specific notifications to be presented to the first user via a user device associated with the first user;
compiling the plurality of user-specific notifications into a notification structure, wherein the notification structure includes at least a top-level composite audible notification and a lower-level composite audible notification to be presented to the first user subsequent to the top-level composite audible notification;
outputting, based at least on the notification structure, the top-level composite audible notification for presentation to the first user via the user device, the top-level composite audible notification identifying a plurality of user-specific notification categories of user-specific audible content including at least a first user-specific notification category and a second user-specific notification category;
receiving a first command in response to the top-level composite audible notification, the first command identifying the first user-specific notification category identified by the top-level composite audible notification;
outputting, based at least on the first user-specific notification category identified by the first command, the lower-level composite audible notification for presentation to the first user via the user device, the lower-level composite audible notification identifying at least a first sub-category of user-specific audible content that is selectable in response to the lower-level composite audible notification; and
modifying the top-level composite audible notification such that the modified top-level composite audible notification (i) includes at least the first sub-category of user-specific audible content included in the lower-level composite audible notification, (ii) causes the first sub-category to be selectable to cause presentation of multiple user-selectable items associated with the first sub-category in response to the modified top-level composite audible notification instead of another lower-level composite audible notification, and (iii) no longer includes the first user-specific notification category such that at least one sub-category of the first user-specific notification category is not accessible by selecting the first user-specific notification category in response to the modified top-level composite audible notification.

6. The method of claim 5, further comprising receiving a notification request from the user device, the user device configured to generate the notification request in response to a voice command received via an audio user interface provided by the user device.

7. The method of claim 6, further comprising outputting the modified top-level composite audible notification for presentation to the first user on the user device such that the modified top-level composite audible notification outputted via the audio user interface reflects the modification performed in response to the first command.

8. The method of claim 5, further comprising modifying the top-level composite audible notification based at least on a determination that the identified category of user-specific audible content has been selected by the first user a threshold number of times.

9. The method of claim 5, wherein the notification structure is a tree structure that includes nested content corresponding to the plurality of user-specific notifications.

10. The method of claim 5, further comprising:
identifying a set of categories for inclusion in the top-level composite audible notification;
determining that the set of categories collectively exceeds an audible notification length threshold associated with the user device;
combining at least two categories of the set of categories into a single category; and
outputting the top-level composite audible notification comprising at least the single category.

11. The method of claim 5, further comprising:
identifying a set of categories for inclusion in the top-level composite audible notification;
determining that the set of categories collectively exceeds an audible notification length threshold associated with the user device;
shortening a length associated with at least one category of the set of categories; and
outputting the top-level composite audible notification comprising the at least one category having the shortened length.

12. The method of claim 5, further comprising:
receiving an indication that the first user has selected additional audible content included in the lower-level composite audible notification, wherein the user device is configured to receive a voice command indicative of the selected additional audible content via an audio user interface; and
outputting another lower-level composite audible notification corresponding to the selected additional audible content for presentation on the user device.

13. The method of claim 5, further comprising compiling the plurality of user-specific notifications at least by:
identifying a first set of user-specific notifications in the plurality of user-specific notifications generated based on at least some of the one or more prior actions of the first user;
gathering the first set of user-specific notifications into the first user-specific notification category of user-specific audible content;
identifying a second set of user-specific notifications in the plurality of user-specific notifications generated based on at least some of the one or more prior actions of the first user, wherein the second set of user-specific notifications is different from the first set of user-specific notifications; and
gathering the second set of user-specific notifications into the second user-specific notification category of user-specific audible content.

14. Non-transitory physical computer storage comprising instructions that, when executed by a hardware processor, configure the hardware processor to:
access, from a storage device storing user data associated with a plurality of users, first user data associated with a first user of the plurality of users, wherein the first user data indicating at least one or more prior actions of the first user;
generate, based at least on the first user data associated with the first user, a plurality of user-specific notifications to be presented to the first user via a user device associated with the first user;
compile the plurality of user-specific notifications into a notification structure, wherein the notification structure includes at least a first audible or visual notification comprising user-specific audible or visual content associated with the first user;
output, based at least on the notification structure, the first audible or visual notification for presentation to the first user on the user device, the first audible or visual notification including at least a first category of user-specific audible or visual content;
receive a first command in response to the first audible or visual notification, the first command identifying the first category of the user-specific audible or visual content included in the first audible or visual notification;
output, based at least on the first category identified by the first command, a second audible or visual notification for presentation to the first user on the user device, the second audible or visual notification comprising additional user-specific audible or visual content associated with the first category portion, wherein the additional user-specific audible or visual content comprises two or more user-selectable portions; and
modify the notification structure such that generating another audible or visual notification based at least on the modified notification structure (i) causes said another audible or visual notification to include at least some of the additional user-specific audible or visual content included in the second audible or visual notification, (ii) causes two or more portions of said at least some of the additional user-specific audible or visual content to be selectable by the first user in response to said another audible or visual notification, and (iii) causes said another audible or visual notification not to include the first category of user-specific audible or visual content such that at least one sub-category of the first category is not accessible by selecting the first category in response to said another audible or visual notification.

15. The non-transitory physical computer storage of claim 14, wherein the first audible or visual notification and the second audible or visual notification are visual notifications, the instructions, when executed by the hardware processor, further configuring the hardware processor to receive a notification request via a browser or mobile application executing on the user device, the user device configured to output the visual notifications via a graphical user interface (GUI) of the browser or mobile application.

16. The non-transitory physical computer storage of claim 15, wherein the instructions, when executed by the hardware processor, further configure the hardware processor to output an additional visual notification for presentation to the first user on the user device such that the additional visual notification outputted via the GUI reflects the modification performed in response to the first command.

17. The non-transitory physical computer storage of claim 14, wherein the instructions, when executed by the hardware processor, further configure the hardware processor to modify the notification structure based at least on a determination that the identified portion has been selected by the first user more than a threshold number of times.

18. The non-transitory physical computer storage of claim 14, wherein the instructions, when executed by the hardware processor, further configure the hardware processor to:
   identify a set of categories for inclusion in the first audible or visual notification;
   determine that the set of categories collectively exceeds a size threshold associated with the user device;
   combine at least two categories of the set of categories into a single category; and
   output the first audible or visual notification comprising at least the single category.

19. The non-transitory physical computer storage of claim 18, wherein the user device comprises a display configured to display visual notifications, the size threshold associated with the user device being a screen size threshold associated with the display of the user device.

20. The non-transitory physical computer storage of claim 18, wherein the user device comprises a speaker configured to output audible notifications, the size threshold associated with the user device being a time limit for which a single composite notification is allowed to be output via the speaker.

21. The non-transitory physical computer storage of claim 14, wherein the second audible or visual notification is a visual notification, the instructions, when executed by the hardware processor, further configuring the hardware processor to:
   receive an indication that the first user has activated a hyperlink associated with the visual notification, wherein the visual notification is presented on the user device in an email message; and
   output another visual notification corresponding to the hyperlink for presentation in a browser or mobile application executing on the user device.

* * * * *

UNITED STATES PATENT AND TRADEMARK OFFICE
CERTIFICATE OF CORRECTION

PATENT NO. : 10,826,862 B1
APPLICATION NO. : 15/907087
DATED : November 3, 2020
INVENTOR(S) : Syama Prasad Suprasadachandran Pillai et al.

Page 1 of 1

It is certified that error appears in the above-identified patent and that said Letters Patent is hereby corrected as shown below:

In the Claims

In Column 25, Lines 36-37, Claim 1, delete "causing such that" and insert --causing--.

In Column 28, Line 36, Claim 14, delete "category portion," and insert --category,--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*